United States Patent
Yao et al.

(10) Patent No.: US 12,210,741 B2
(45) Date of Patent: Jan. 28, 2025

(54) TOUCH METHOD FOR ELECTRONIC DEVICE WITH A FOLDABLE DISPLAY

(71) Applicant: HUAWEI TECHNOLOGIES CO., LTD., Guangdong (CN)

(72) Inventors: Songping Yao, Beijing (CN); Hao Wang, Shanghai (CN); Xingmin Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/638,325

(22) PCT Filed: Aug. 28, 2020

(86) PCT No.: PCT/CN2020/112195
§ 371 (c)(1),
(2) Date: Feb. 25, 2022

(87) PCT Pub. No.: WO2021/037223
PCT Pub. Date: Mar. 4, 2021

(65) Prior Publication Data
US 2022/0291830 A1     Sep. 15, 2022

(30) Foreign Application Priority Data
Aug. 29, 2019 (CN) .......................... 201910810118.3

(51) Int. Cl.
G06F 3/04817      (2022.01)
G06F 3/04886      (2022.01)
G06F 3/14         (2006.01)

(52) U.S. Cl.
CPC ...... *G06F 3/04886* (2013.01); *G06F 3/04817* (2013.01); *G06F 3/14* (2013.01); *G06F 2203/04803* (2013.01)

(58) Field of Classification Search
None
See application file for complete search history.

(56) References Cited

U.S. PATENT DOCUMENTS

2007/0002016 A1    1/2007  Cho et al.
2013/0194217 A1*   8/2013  Lee .......................... G06F 3/041
                                                        345/173

(Continued)

FOREIGN PATENT DOCUMENTS

CN    104298392 A    1/2015
CN    104615303 A    5/2015

(Continued)

OTHER PUBLICATIONS

CN109925711A "Application control method and device, terminal device and computer readable storage medium" Inventors: Zhang Haiping Publication: Jun.25, 2019 (Year: 2019).*

(Continued)

*Primary Examiner* — Rinna Yi

(57) ABSTRACT

A method may be applied to an electronic device configured with a foldable display. The display includes a first area, a second area, and a third area, and when the electronic device is in a folded form, an included angle between the first area and the third area is less than a first preset angle, and two sides of a third area are the first area and the second area. The method includes: displaying a first interface in the first area, where the first interface includes one or more touchable areas; determining a first touch area between a user and the third area; mapping a touch function of a first touchable area in the first interface to the first touch area; detecting a first operation in the first touch area; and controlling the first touchable area in the first interface based on the first operation.

16 Claims, 13 Drawing Sheets

(56) References Cited

U.S. PATENT DOCUMENTS

| | | | | |
|---|---|---|---|---|
| 2015/0015513 | A1* | 1/2015 | Kwak | G06F 3/0486 |
| | | | | 345/173 |
| 2015/0160699 | A1* | 6/2015 | Choi | G06F 1/1652 |
| | | | | 345/173 |
| 2016/0070338 | A1* | 3/2016 | Kim | G06F 3/0416 |
| | | | | 345/173 |
| 2016/0299590 | A1* | 10/2016 | Chen | G06F 1/1626 |
| 2016/0357298 | A1* | 12/2016 | Kim | G06F 1/1643 |
| 2016/0372083 | A1 | 12/2016 | Taite et al. | |
| 2017/0118402 | A1* | 4/2017 | Bok | H04N 23/90 |
| 2018/0129250 | A1 | 5/2018 | La et al. | |
| 2018/0224963 | A1* | 8/2018 | Lee | G06F 3/04186 |
| 2018/0342226 | A1 | 11/2018 | Shin et al. | |
| 2019/0028579 | A1* | 1/2019 | Cho | H04M 1/0268 |

FOREIGN PATENT DOCUMENTS

| | | |
|---|---|---|
| CN | 104898959 A | 9/2015 |
| CN | 105120160 A | 12/2015 |
| CN | 105683895 A | 6/2016 |
| CN | 106227444 A | 12/2016 |
| CN | 106406656 A | 2/2017 |
| CN | 108132706 A | 6/2018 |
| CN | 108614677 A | 10/2018 |
| CN | 108762619 A | 11/2018 |
| CN | 109925711 A | 6/2019 |
| CN | 110035154 A | 7/2019 |
| CN | 110072008 A | 7/2019 |
| CN | 110673783 A | 1/2020 |
| CN | 110839096 A | 2/2020 |

OTHER PUBLICATIONS

ITU-T H.264(Jun. 2019), Series H: Audiovisual and Multimedia Systems, Infrastructure of audiovisual services-Coding of moving video, Advanced video coding for generic audiovisual services, total 836 pages.
International Search Report and Written Opinion issued in PCT/CN2020/112195, dated Dec. 2, 2020, 12 pages.
Office Action issued in CN201910810118.3, dated Aug. 27, 2020, 8 pages.
Notice of Allowance issued in CN201910810118.3, dated Oct. 20, 2021, 4 pages.

* cited by examiner

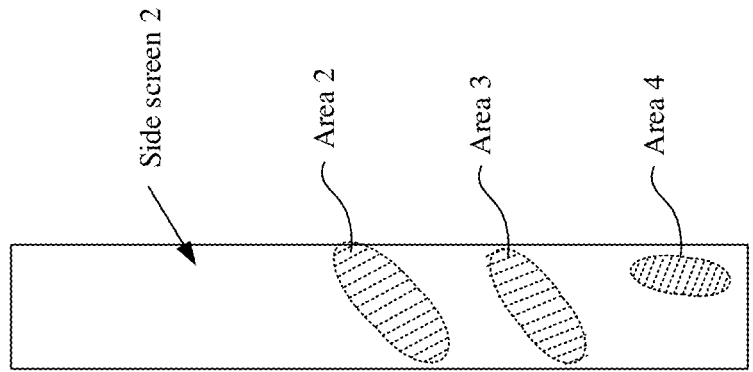
FIG. 7(c)
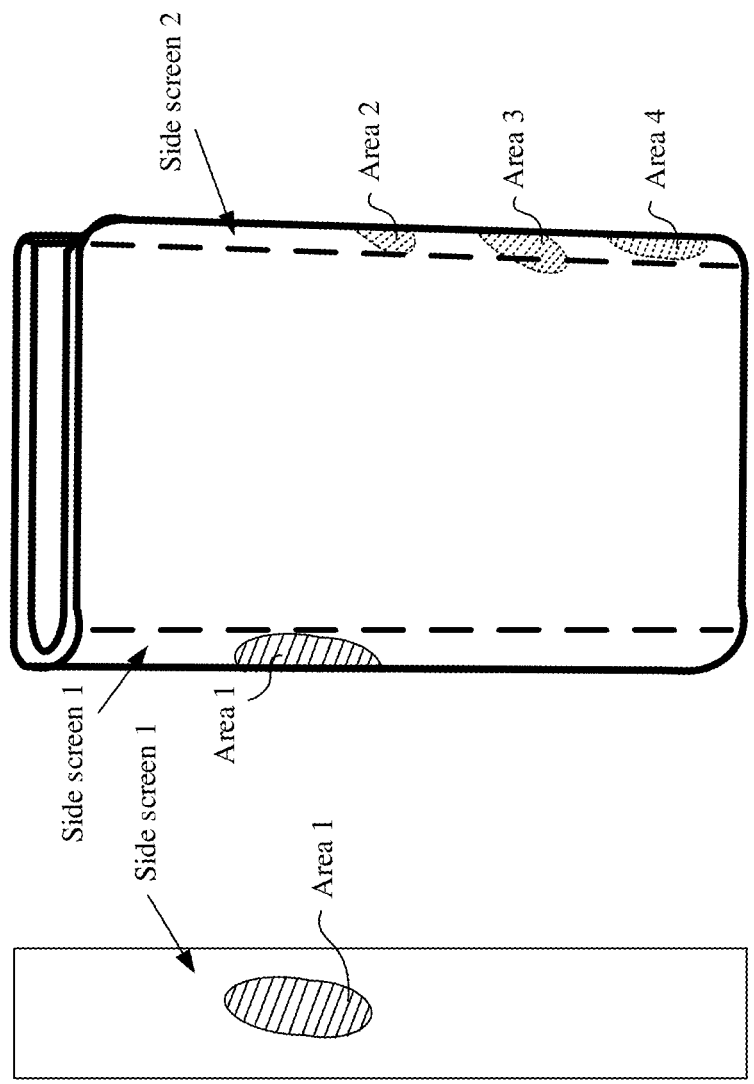
FIG. 7(b)
FIG. 7(a)

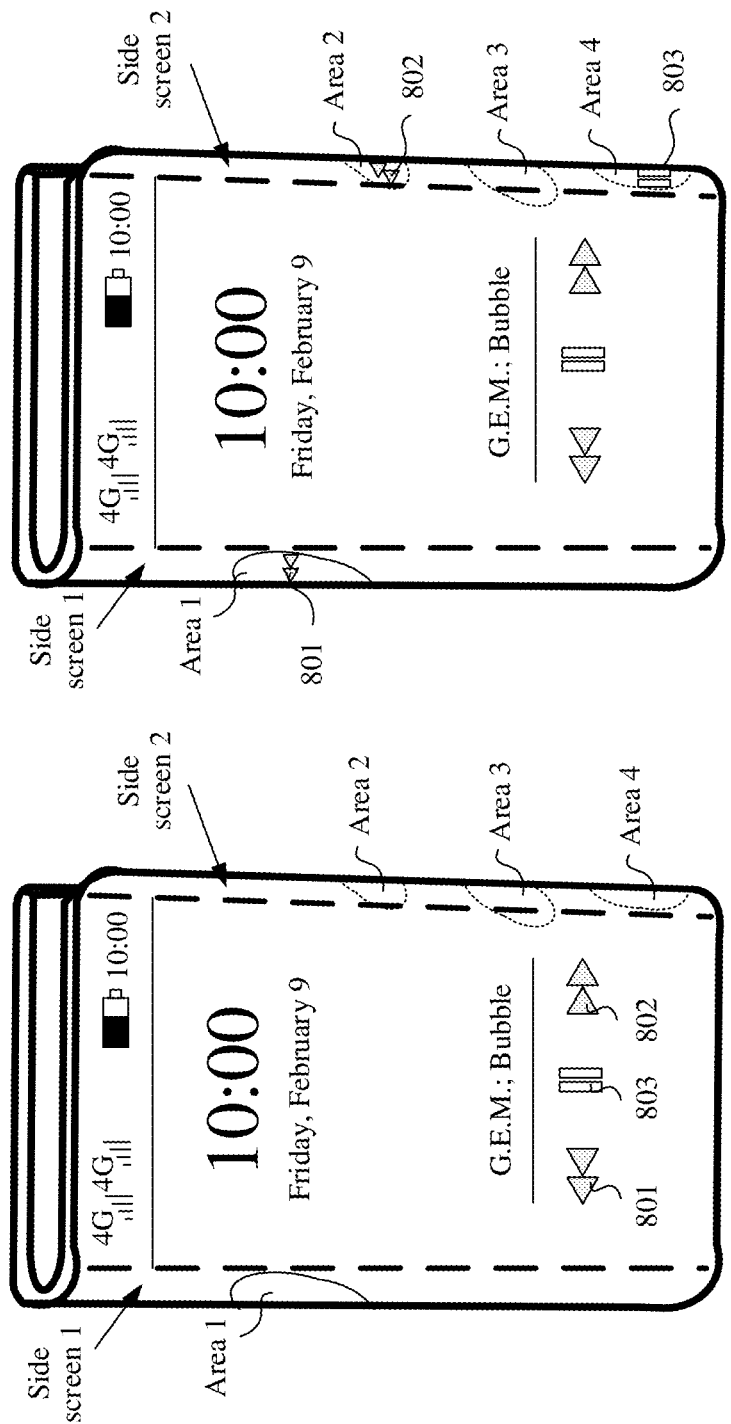

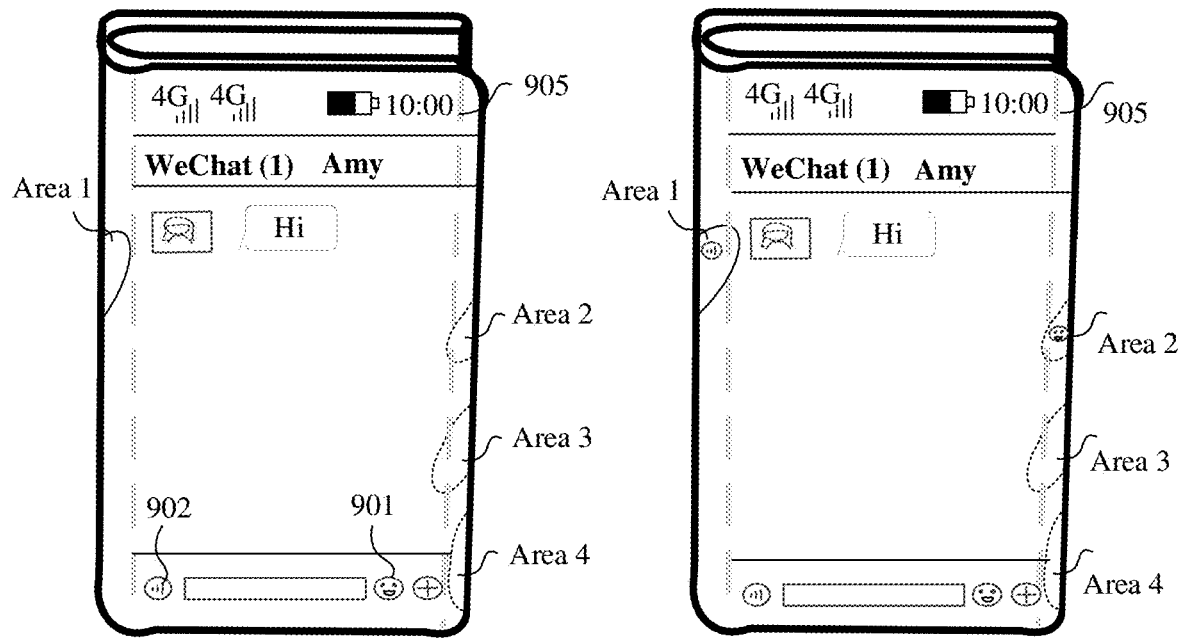
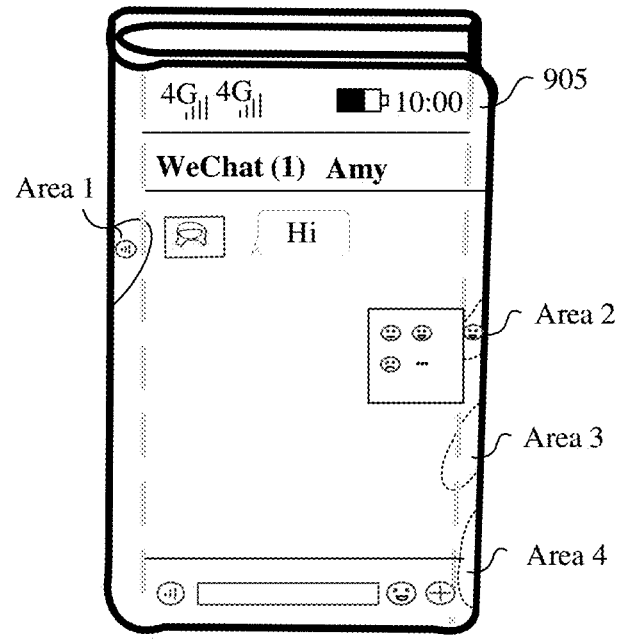
FIG. 9(a)  FIG. 9(b)
FIG. 9(c)

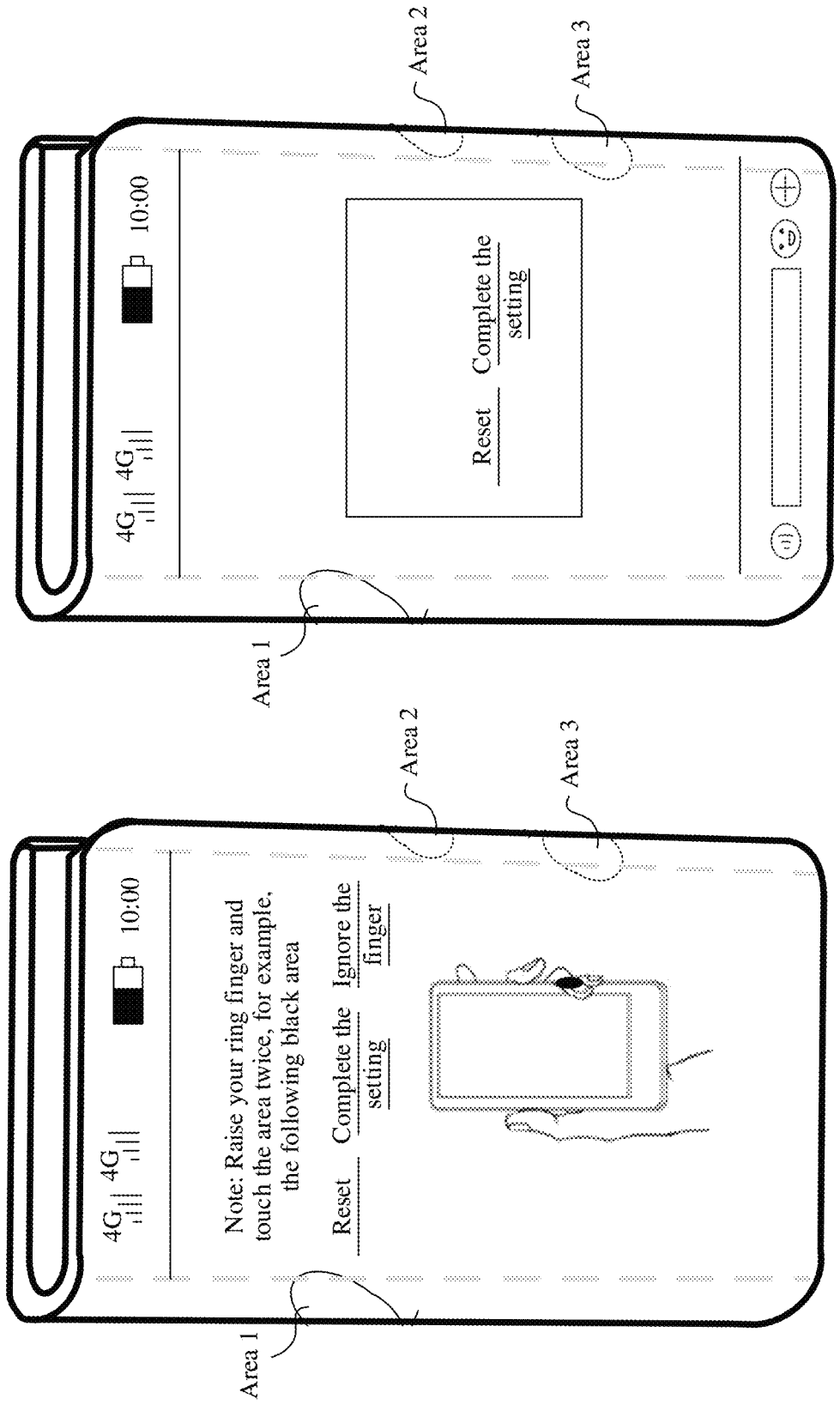

TOUCH METHOD FOR ELECTRONIC DEVICE WITH A FOLDABLE DISPLAY

CROSS-REFERENCE TO RELATED APPLICATIONS

This application is a National Stage of International Application No. PCT/CN2020/112195 filed on Aug. 28, 2020, which claims priority to Chinese Patent Application No. 201910810118.3, filed on Aug. 29, 2019, both of which are hereby incorporated by reference in their entireties.

TECHNICAL FIELD

This application relates to the field of electronic technologies, and in particular, to a touch method and an electronic device.

BACKGROUND

With popularization of application of mobile devices such as mobile phones, people have an increasingly strong demand for large-screen mobile phones. Full-screen mobile phones, curved-screen mobile phones, and mobile phones with foldable displays have emerged. When a foldable mobile phone is unfolded, there is a large screen. When the foldable mobile phone is folded, there are a primary screen, a secondary screen, and a side screen, and the side screen is an area in which the foldable mobile phone is folded.

When the foldable mobile phone is folded, how to properly utilize the side screen is a problem that needs to be considered.

SUMMARY

One of the objectives of this application is to provide a touch method and an electronic device, to properly utilize a side screen of a foldable mobile phone, thereby improving user experience.

The foregoing objective and other objectives are achieved by using features in independent claims. Further implementations are embodied in dependence claims, the specification, and accompanying drawings.

According to a first aspect, an embodiment of this application provides a touch method, applied to an electronic device configured with a foldable display. The display includes a first area, a second area, and a third area, and when the electronic device is in a folded form, an included angle between the first area and the second area is less than a first preset angle, and two sides of the third area are the first area and the second area. The method includes: displaying a first interface in the first area, where the first interface includes one or more touchable areas; determining a first touch area between a user and the third area in a process in which the user holds the electronic device; mapping a touch function of a first touchable area in the first interface to the first touch area; detecting a first operation in the first touch area; and controlling the first touchable area in the first interface based on the first operation.

It should be noted that, in the touch method provided in this embodiment, when being in a folded form, the electronic device may map touch functions of one or more touchable areas of the first area (for example, a primary screen) and/or the second area (for example, a secondary screen) to the third area (that is, a side screen). In other words, the user may control the primary screen and/or the secondary screen by using the side screen, thereby facilitating user operations.

In an example embodiment, the first touchable area includes one or more buttons, and the electronic device may display icons of the one or more buttons in the first touch area.

It should be noted that, in the touch method provided in this embodiment, when being in a folded form, the electronic device may map the touch functions of the one or more touchable areas of the first area (for example, the primary screen) and/or the second area (for example, the secondary screen) to the third area (that is, the side screen), for example, display icons of one or more buttons of the primary screen and/or the secondary screen on the side screen. In other words, the user may control the primary screen and/or the secondary screen by using the icons on the side screen, thereby facilitating user operations.

In an example embodiment, the electronic device may further map a volume adjustment function and/or a display brightness adjustment function to a second touch area in the second area.

It should be noted that, in the touch method provided in this embodiment, when the electronic device is in a folded form, the user may further adjust volume and display brightness of the electronic device by using the side screen, thereby facilitating user operations.

In an example embodiment, the electronic device may further determine that a touch area between the user and the third area in the process in which the user holds the electronic device changes from the first touch area to a third touch area, and map a touch function of the first touchable area to the third touch area.

It should be noted that, in the touch method provided in this embodiment, when the electronic device is in a folded form, a touch area between the user and the third area, that is, the side screen, in the process in which the user holds the electronic device may change, and the electronic device may map the touch functions of the one or more touchable areas of the first area (for example, the primary screen) and/or the second area (for example, the secondary screen) to a new touch area on the side screen. In other words, when a touch area between the user and the side screen changes, the user may control the primary screen and/or the secondary screen by using the side screen, thereby facilitating user operations.

In an example embodiment, the first touchable area is specified by the user, or is preset, or is a touch area with most or least touches in the first interface.

It should be understood that the first touchable area may be set in a plurality of manners, and the foregoing several manners are merely examples rather than limitations.

In an example embodiment, the electronic device may further light up the first touch area, where an area in the third area other than the first touch area is in a screen-off state; or the electronic device displays a first color in the first touch area, and displays a second color in an area in the third area other than the first touch area.

It should be noted that, after mapping the touch functions of the one or more touchable areas of the first area (for example, the primary screen) and/or the second area (for example, the secondary screen) to the first touch area of the third area (that is, the side screen), the electronic device may light up the first touch area, and does not light up the area on the side screen other than the first touch area, or the electronic device displays the first color in the first touch area, to prompt the user with an area that is on the side screen and to which the touch functions are mapped. In the method, the user may control the primary screen and/or the secondary screen by using the side screen, thereby facilitating user operations.

In an example embodiment, the electronic device may further disable the touch function of the first touchable area in the first interface, and/or cancel displaying the icons of the one or more buttons in the first interface.

It should be noted that, after mapping the touch functions of the one or more touchable areas of the first area (for example, the primary screen) and/or the second area (for example, the secondary screen) to the third area (that is, the side screen), the electronic device may disable the touch functions of the one or more touchable areas on the primary screen and/or the secondary screen, and if the touchable areas include one or more buttons, the electronic device may cancel displaying the one or more buttons on the primary screen and/or the secondary screen. In the method, the user may control the primary screen and/or the secondary screen by using the side screen, thereby facilitating user operations.

According to a second aspect, an embodiment of this application further provides an electronic device. The electronic device includes a foldable display, one or more processors, and one or more memories. The one or more memories store one or more computer programs, the one or more computer programs include instructions, and when the instructions are executed by the one or more processors, the electronic device is enabled to perform the technical solution in any one of the first aspect or the example embodiments of the first aspect.

According to a third aspect, an embodiment of this application further provides an electronic device. The electronic device includes modules/units that perform the method in any one of the first aspect or the example embodiments of the first aspect. These modules/units may be implemented by hardware, or may be implemented by hardware by executing corresponding software.

According to a fourth aspect, an embodiment of this application further provides a chip. The chip is coupled to a memory in an electronic device, and performs the technical solution in any one of the first aspect or the example embodiments of the first aspect of embodiments of this application. In embodiments of this application, "coupled" means that two components are directly or indirectly connected to each other.

According to a fifth aspect, an embodiment of this application provides a computer-readable storage medium. The computer-readable storage medium includes a computer program, and when the computer program is run on an electronic device, the electronic device is enabled to perform the technical solution in any one of the first aspect or the example embodiments of the first aspect of this application.

According to a sixth aspect, an embodiment of this application provides a computer program product. When the computer program product is run on an electronic device, the electronic device is enabled to perform the technical solution in any one of the first aspect or the example embodiments of the first aspect of this application.

According to a seventh aspect, a graphical user interface on an electronic device is provided. The electronic device has a foldable display, one or more memories, and one or more processors. The one or more processors are configured to execute one or more computer programs stored in the one or more memories, and the graphical user interface includes a graphical user interface displayed when the electronic device performs the technical solution in any one of the first aspect or the example embodiments of the first aspect of this application.

BRIEF DESCRIPTION OF DRAWINGS

FIG. 7(a) to FIG. 7(c) are a schematic diagram in which a user touches a side screen of an electronic device when the user holds the electronic device according to an embodiment of this application;

FIG. 8(a) and FIG. 8(b) are a schematic diagram of a graphical user interface of a foldable electronic device according to an embodiment of this application;

FIG. 9(a) to FIG. 9(c) are a schematic diagram of a graphical user interface of a foldable electronic device according to an embodiment of this application;

FIG. 10(a) to FIG. 10(f) are a schematic diagram of a graphical user interface of a foldable electronic device according to an embodiment of this application;

DESCRIPTION OF EMBODIMENTS

Figure 1:
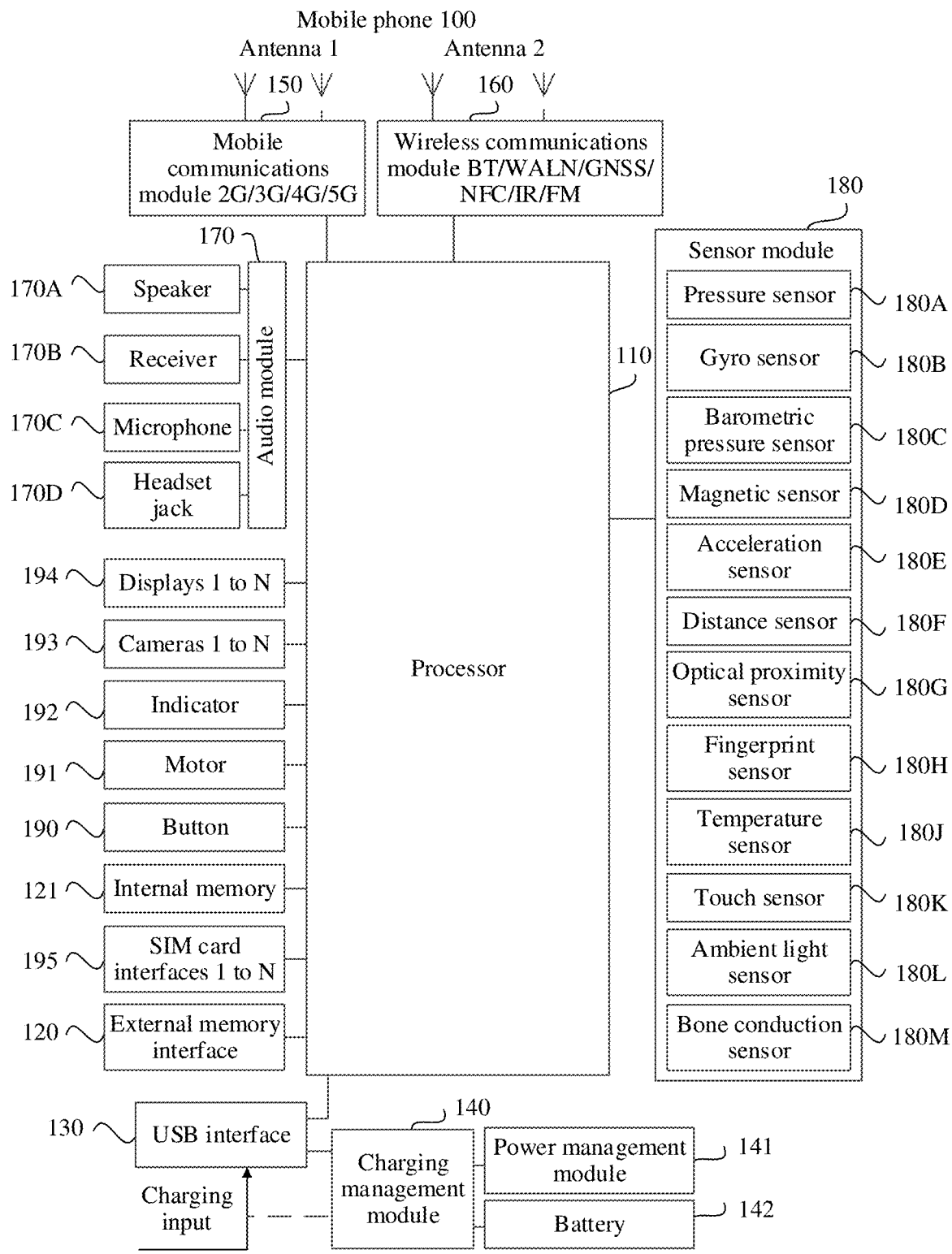
FIG. 1 is a schematic diagram of a hardware structure of a foldable electronic device according to an embodiment of this application.

Technical solutions in embodiments of this application are described in detail below with reference to accompanying drawings of following embodiments of this application.

Terms used in following embodiments are merely intended to describe specific embodiments, but are not intended to limit this application. As used in the specification and appended claims of this application, the terms "a", "an", "the", "above", "this", and "this one" of singular forms are intended to also include plural forms, for example, "one or more", unless otherwise clearly specified in the context. It should be further understood that, in embodiments of this application, "one or more" refers to one, two, or more, and the term "and/or" describes an association between associated objects, and indicates that three relationships may exist. For example, A and/or B may indicate the following cases: Only A exists, both A and B exist, and only B exists, where A and B may be singular or plural. The character "/" usually indicates an "or" relationship between the associated objects.

Reference to "an embodiment", "some embodiments", or the like described in this specification means that one or more embodiments of this application include a specific feature, structure, or characteristic described with reference to embodiments. Therefore, statements such as "in an embodiment", "in some embodiments", "in some other embodiments", and "in other embodiments", that appear at different places in this specification do not necessarily mean referring to a same embodiment, instead, they mean "one or more but not all of embodiments", unless otherwise specifically emphasized. The terms "include", "contain", "have", and their variants all mean "include but are not limited to", unless otherwise specifically emphasized.

Some terms in embodiments of this application are explained below first, to facilitate understanding of a person skilled in the art.

In embodiments of this application, "at least one" means one or more, and "more" thereof means two or more. In addition, it should be understood that, in descriptions of this application, terms such as "first" and "second" are merely used for the purpose of distinguishing the descriptions, cannot be understood as an indication or implication of relative importance, and cannot be understood as an indication or implication of a sequence.

An application (app) in embodiments of this application may be a software program that can implement one or more specific functions. Generally, a plurality of applications may be installed on an electronic device, for example, an instant messaging application, a video application, an audio application, an image shooting application. The instant messaging application may include, for example, Messages, WeChat, WhatsApp Messenger, LINE, Instagram, Kakao Talk, and DingTalk. The image shooting application may include, for example, a camera application (a system camera or a third-party camera application). The video application may include, for example, YouTube, Twitter, TikTok, iQIYI, and Tencent Video. The audio application may include, for example, KuGou, EMUMO, and QQ Music. An application mentioned in the following embodiments may be an application installed before delivery of the electronic device, or may be an application downloaded from a network or obtained from another electronic device by a user in a process of using the electronic device.

Embodiments of this application provide a touch method. The method may be applied to any electronic device with a side screen, such as a mobile phone, a tablet computer, a wearable device (for example, a smartwatch, a smart, band, or a smart helmet), a vehicle-mounted device, a smart home device, an augmented reality (AR) device/a virtual reality (VR) device, a notebook computer, an ultra-mobile personal computer (UMPC), a netbook, or a personal digital assistant (PDA).

In the touch method provided in embodiments of this application, the side screen of the electronic device may be used as a touch area, that is, a user may perform a touch operation by using the side screen, to control the electronic device. In some embodiments, an electronic device with a side screen may be an electronic device with a curved screen. For example, the curved screen is disposed on a front surface and a side surface of the electronic device. A display area corresponding to the front surface of the electronic device may be used as a primary screen, and a display area corresponding to the side surface of the electronic device may be used as the side screen. For another example, an electronic device with a side screen may alternatively be an electronic device configured with a foldable screen, for example, a foldable mobile phone. The foldable mobile phone is used as an example. When the foldable mobile phone is in a folded state, a bending display area on a foldable screen may be used as the side screen. It should be noted that the touch method provided in embodiments of this application may be applied to any electronic device with a side screen. Examples are not listed one by one in embodiments of this application. In the following embodiment, an electronic device with a foldable screen is mainly used as an example for description.

For example, FIG. 1 is a schematic diagram of a structure of an electronic device with a foldable screen.

As shown in FIG. 1, the foldable electronic device may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The controller may be a nerve center and a command center of the foldable electronic device. The controller may generate an operation control signal based on an instruction operation code and a time sequence signal, to complete control of instruction fetching and instruction execution. The memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory, to avoid repeated access and reduce a waiting time of the processor 110, thereby improving system efficiency.

The USB interface 130 is an interface that conforms to a USB standard specification, and may be specifically a mini USB interface, a micro USB interface, a USB Type-C interface, or the like. The USB interface 130 may be configured to connect to a charger to charge the foldable electronic device, or may be configured to perform data transmission between the foldable electronic device and a peripheral device. The charging management module 140 is configured to receive a charging input from the charger. The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communication function of the foldable electronic device may be implemented through the antenna 1, the antenna 2, the mobile communications module 150, the wireless communications module 160, the modem processor, the baseband processor, and the like. The antenna 1 and the antenna 2 are configured to transmit and receive an electromagnetic wave signal. Each antenna in the foldable electronic device may he configured to cover one or more communications frequency bands. Different antennas may he further multiplexed, to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the foldable electronic device, to wireless communication including 2G/3G/4G/5G and the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The wireless communications module 160 may provide a solution, applied to the foldable electronic device, to wireless communication including a wireless local area network (WLAN) (for example, a wireless fidelity (Wi-Fi) network), Bluetooth (BT), a global navigation satellite system (GNSS), frequency modulation (FM), near field communication (NFC), infrared (IR), and the like. The wireless communications module 160 may be one or more components integrating at least one communication processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the foldable electronic device are coupled, and the antenna 2 and the wireless communications module 160 in the foldable electronic device are coupled, so that the foldable electronic device can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The display 194 is configured to display a display interface of an application and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the foldable electronic device may include one or N displays 194, where N is a positive integer greater than 1.

The camera 193 is configured to capture a static image or a video. In some embodiments, the camera 193 may include at least one camera, for example, one front-facing camera and one rear-facing camera.

The internal memory 121 may be configured to store computer-executable program code, and the executable program code includes instructions. The processor 110 runs the instructions stored in the internal memory 121, to perform various function applications and data processing of the foldable electronic device. The internal memory 121 may include a program storage area and a data storage area. The program storage area may store an operating system, software code of at least one application (such as iQIYI or WeChat), and the like. The data storage area may store data (for example, an image and a video) created in a use process of the foldable electronic device. In addition, the internal memory 121 may include a high-speed random access memory, and may further include a non-volatile memory such as at least one disk storage device, a flash memory, or a universal flash storage (UFS).

The external memory interface 120 may be configured to connect to an external memory card such as a micro SD card, to expand a storage capability of the foldable electronic device. The external memory card communicates with the processor 110 through the external memory interface 120, to implement a data storage function. For example, files such as an image and a video are stored in the external memory card.

The foldable electronic device may implement audio functions such as music playing and recording through the audio module 170, the speaker 170A, the receiver 170B, the microphone 170C, the headset jack 170D, the application processor, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. The gyro sensor 180B may be configured to determine a moving posture of the foldable electronic device. In some embodiments, an angular velocity of the foldable electronic device around three axes (that is, axes X, Y, and Z) may be determined through the gyro sensor 180B.

The gyro sensor 180B may be configured to implement image stabilization during photographing. The barometric pressure sensor 180C is configured to measure barometric pressure. In some embodiments, the foldable electronic device calculates an altitude based on a barometric pressure value measured by the barometric pressure sensor 180C, to assist in positioning and navigation. The magnetic sensor 180D includes a Hall sensor. The foldable electronic device may detect opening and closing of a flip cover through the magnetic sensor 180D. In some embodiments, when the foldable electronic device is a clamshell phone, the foldable electronic device may detect opening and closing of a flip cover through the magnetic sensor 180D. Further, a feature such as automatic unlocking upon opening of the flip cover is set based on a detected opening or closing state of the flip cover. The acceleration sensor 180E may detect magnitudes of accelerations of the foldable electronic device in various directions (usually on three axes). A magnitude and a direction of gravity may be detected when the foldable electronic device is still. The acceleration sensor 180E may be further configured to identify a posture of the electronic device, and is applied to an application such as switching between landscape mode and portrait mode or a pedometer.

The distance sensor 180F is configured to measure a distance. The foldable electronic device may measure a distance in an infrared or a laser manner. In some embodiments, in a photographing scenario, the foldable electronic device may measure a distance through the distance sensor 180F, to implement quick focusing. The optical proximity sensor 180G may include, for example, a light emitting diode (LED) and an optical detector, for example, a photodiode. The light emitting diode may be an infrared light emitting diode. The foldable electronic device emits infrared light through the light emitting diode. The foldable electronic device detects infrared reflected light from a nearby object through the photodiode. When sufficient reflected light is detected, it may be determined that there is an object near the foldable electronic device. When insufficient reflected light is detected, the foldable electronic device may determine that there is no object near the foldable electronic device. The foldable electronic device may detect, through the optical proximity sensor 180G, that the user holds the foldable electronic device close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The foldable electronic device may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the foldable electronic device is in a pocket, to avoid an accidental touch. The fingerprint sensor 180H is configured to collect a fingerprint. The foldable electronic device may use a feature of the collected fingerprint to implement fingerprint-based unlocking, unlocking for application access, fingerprint-based photographing, fingerprint-based call answering, and the like.

The temperature sensor 180J is configured to detect a temperature. In some embodiments, the foldable electronic device executes a temperature processing policy by using the temperature detected by the temperature sensor 180J. For example, when the temperature reported by the temperature sensor 180J exceeds a threshold, the foldable electronic device lowers performance of a processor nearby the temperature sensor 180J, to reduce power consumption for thermal protection. In some other embodiments, when the temperature is lower than another threshold, the foldable electronic device heats the battery 142 to prevent the foldable electronic device from being shut down abnormally because of a low temperature. In some other embodiments, when the temperature is lower than still another threshold, the foldable electronic device boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor to determine a type of a touch event. The display 194 may provide a visual output related to the touch operation. In some other embodiments, the touch sensor 180K may alternatively be disposed on a surface of the foldable electronic device at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal.

The button 190 includes a power button, a volume button, and the like. The button 190 may be a mechanical button, or may be a touch button. The foldable electronic device may receive a key input, and generate a key signal input related to a user setting and function control of the foldable electronic device. The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The indicator 192 may be an indicator, and may be configured to indicate a charging status and a power change, or may be configured to indicate a message, a missed call, a notification, and the like. The SIM card interface 195 is configured to connect to a SIM card. The SIM card may be inserted into the SIM card interface 195 or detached from the SIM card interface 195, to implement contact with or separation from the foldable electronic device.

It may be understood that the components shown in FIG. 1 do not constitute a specific limitation on a mobile phone. The mobile phone may further include more or fewer components than those shown in the figure, or some components may be combined, or some components may be split, or different component arrangements may be used. In the following embodiments, the foldable electronic device shown in FIG. 1 is used as an example for introduction.

Figure 2:
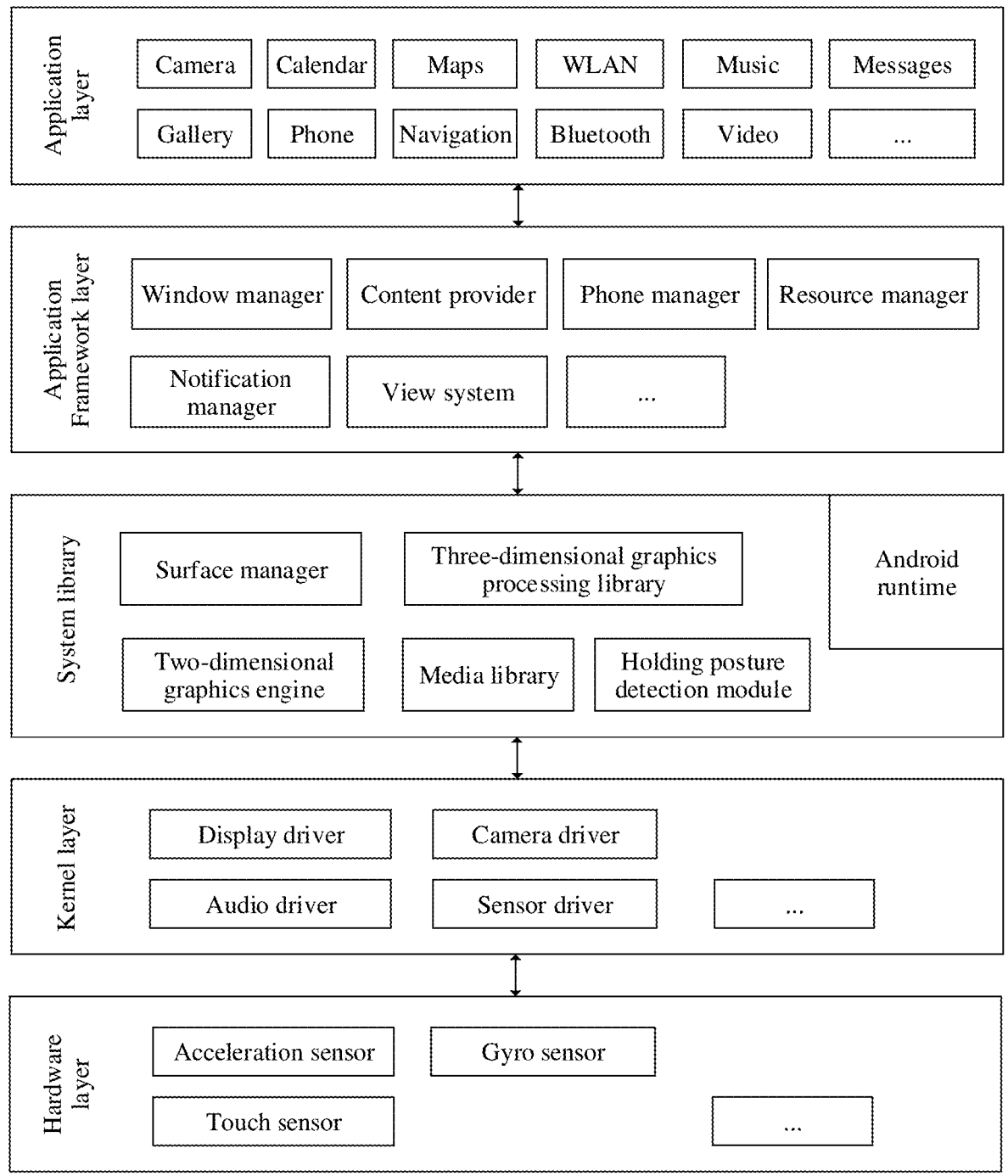
FIG. 2 is a schematic diagram of a software structure of a foldable electronic device according to an embodiment of this application.

FIG. 2 is a block diagram of a software structure of an electronic device according to an embodiment of this application. As shown in FIG. 2, the software structure of the electronic device may be a layered architecture. For example, software may be divided into several layers, and each layer has a clear role and task. The layers communicate with each other through a software interface. In some embodiments, an Android system is divided into four layers: an application layer, an application framework (FWK) layer, an Android runtime and system library, and a kernel layer from top to bottom.

The application layer may include a series of application packages. As shown in FIG. 2, the application layer may include "Camera", "Settings", a skin module, a user interface (UI), a third-party application, and the like. The third-party application may include "WeChat", "QQ", "Gallery", "Calendar", "Phone", "Maps", "Navigation", "WLAN", "Bluetooth", "Music", "Videos", "Messages", and the like.

The application framework layer provides an application programming interface (API) and a programming framework for an application at the application layer. The application framework layer may include some predefined functions. As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like. The content provider is configured to: store and obtain data, and enable the data to be accessed by an application. The data may include a video, an image, audio, calls that are made and received, a browsing history and bookmarks, an address book, and the like.

The view system includes visual controls such as a control for displaying a text and a control for displaying an image. The view system may be configured to construct an application. A display interface may include one or more views. For example, a display interface including a Messages notification icon may include a text display view and an image display view.

The phone manager is configured to provide a communication function of the electronic device 100, for example, management of a call status (including answering or declining).

The resource manager provides an application with various resources such as a localized character string, an icon, an image, a layout file, and a video file.

The notification manager enables an application to display notification information in a status bar, and may be configured to convey a notification type message. The notification manager may automatically disappear after a short pause without requiring a user interaction. For example, the notification manager is configured to notify download completion and give a message notification. The notification manager may alternatively be a notification that appears in a top status bar of the system in a form of a graph or a scroll bar text, for example, a notification of an application running on the background, or may be a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android. The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

In addition, the system library may further include a holding posture detection module, configured to detect a holding state of the electronic device by the user. For example, the holding posture detection module may be configured to determine a holding state of the electronic device by the user based on sensor data uploaded by various types of sensors at a hardware layer.

The kernel layer is a layer between hardware and software. The kernel layer includes at least a display driver, a camera driver, an audio driver, and a sensor driver.

The hardware layer may include various types of sensors, for example, an acceleration sensor, a gyro sensor, and a touch sensor in embodiments of this application.

The following describes examples of working procedures of software and hardware of the electronic device with reference to a touch method in embodiments of this application.

In an example, a sensor at the hardware layer may collect sensor data. For example, the sensor at the hardware layer detects a plurality of touch events of the user on a side screen. The hardware layer may send the touch events to the system library by using the kernel layer, Because the holding posture detection module in the system library determines a touch area corresponding to each touch event, the system library may further map touch functions/icons of one or more controls in a first interface currently displayed on a primary screen to the touch area corresponding to each touch event. For example, the system library may establish a mapping relationship between the touch area and an area in which the one or more controls on the primary screen are located, or the system library displays the icons of the one or more controls on the primary screen in the touch area by using the hardware layer.

After detecting a first touch event of the user on the side screen again, the sensor at the hardware layer reports the first touch event to the system library. The system library determines a first touch area corresponding to the first touch event, determines an area in which a first control corresponding to the first touch area on the primary screen is located, and maps the first touch event to the first control on the primary screen. The system library controls, by using the kernel layer, the hardware layer to respond to an operation on the first control on the primary screen.

FIG. 3(a) to FIG. 3(d) shows a plurality of physical forms of an electronic device with a foldable screen according to an embodiment of this application. FIG. 4 is a schematic diagram of unfolded angles corresponding to different physical forms of an electronic device with a foldable screen according to an embodiment of this application. The following embodiments describe the electronic device with reference to FIG. 3(a) to FIG. 3(d) and FIG. 4.

Figure 3A:
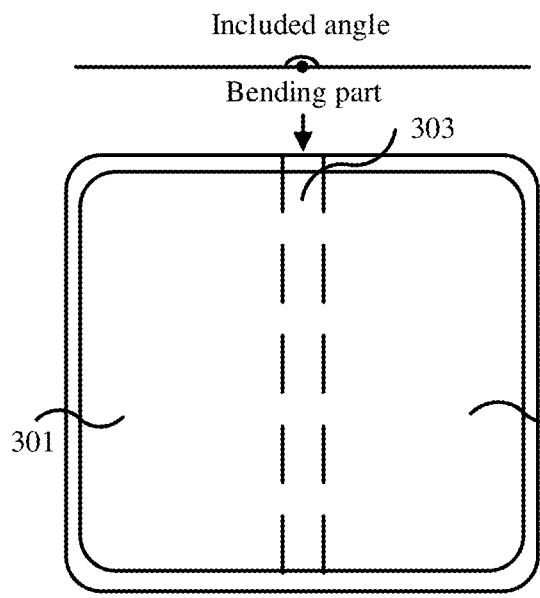
FIG. 3(a) to FIG. 3(d) are a schematic diagram of a physical form of a left-right foldable electronic device according to an embodiment of this application.

As shown in FIG. 3(a), a display area on the foldable screen of the electronic device may include three areas: a first display area 301, a second display area 302, and a third display area 303, and the third display area 303 may be a foldable area. When the third display area 303 is bent or deformed, the third display area 303 may form a side screen, as shown in FIG. 3(b), FIG. 3(c), and FIG. 3(d).

In some embodiments, the foldable screen of the electronic device may be an entire screen, and the first display area, the second display area, and the third display area may be different areas on the entire screen. In some other embodiments, the foldable screen of the electronic device may be formed by splicing a plurality of screens, for example, three screens. A first display area is a display area on a first screen, a second display area is a display area on a second screen, and a third display area is a display area on a third screen. This is not limited in embodiments of this application, It should be understood that the first display area on the foldable. screen may be used as a primary screen, and the second display area on the foldable screen may be used as a secondary screen; or the first display area may be used as a secondary screen, and the second display area may be used as a primary screen. Functions of the primary screen and the secondary screen may be same or different. Specifically, an area that is used as the primary screen and an area that is used as the secondary screen may be specified by a user, or may be set by default before delivery of a foldable electronic device. This is not limited in embodiments of this application.

In some embodiments, when included angles between the first display area 301 and the second display area 302 on the foldable screen are different, the electronic device may have different physical forms, for example, a folded form, a semi-folded form with a specific angle, and an unfolded form. It should be understood that division of physical forms and definition of each physical form of a display of a foldable electronic device are not limited in this application.

Figure 3B:
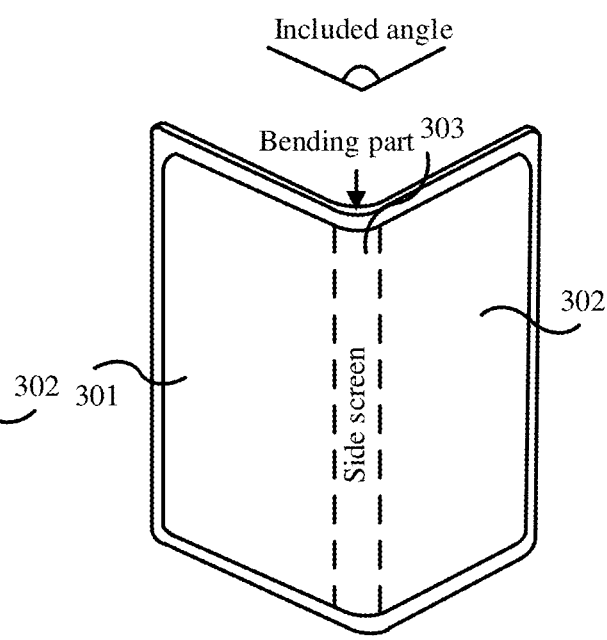
Figure 3C:
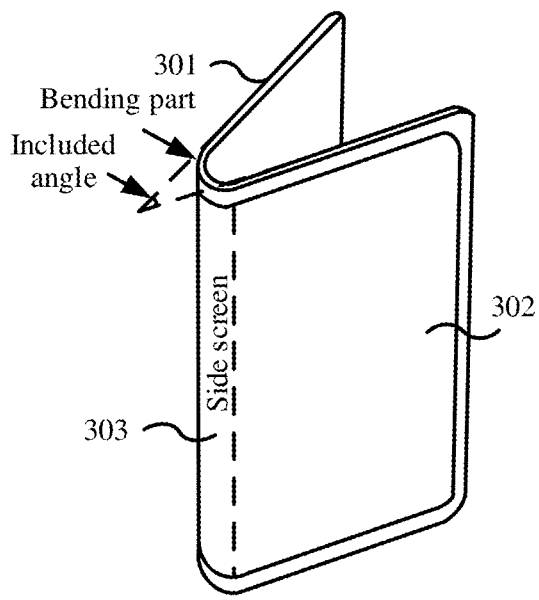
Figure 3D:
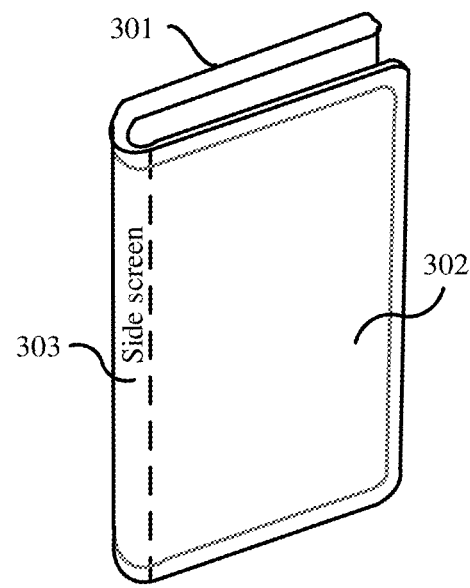
Figure 4:
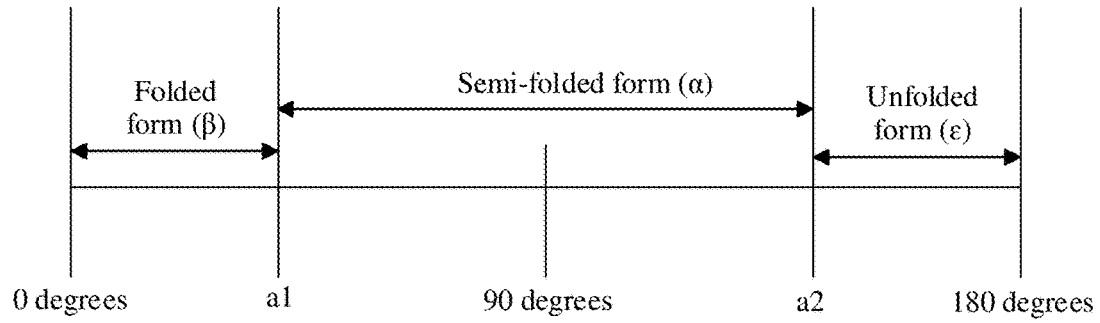
FIG. 4 is a schematic diagram of unfolded angles corresponding to different physical forms of a foldable electronic device according to an embodiment of this application.

For example, when being in an unfolded form, the electronic device may be shown in FIG. 3(a) or in FIG. 3(b). Specifically, when the electronic device is in an unfolded form, an included angle between the first display area 301 and the second display area 302 is a first angle ε. As shown in FIG. 4, a2≤ε≤1.80 degrees, where a2 is greater than 90 degrees and less than or equal to 180 degrees. For example, a2 may be 150 degrees or 180 degrees.

For example, when being in a semi-folded form, the electronic device may be shown in FIG. 3(c). Specifically, when the electronic device is in a semi-folded form, an included angle between the first display area 301 and the second display area 302 is a second angle α. As shown in FIG. 4, a1≤α≤a2, where a1 is greater than 0 degrees and less than or equal to 90 degrees, and a2 is greater than or equal to 90 degrees and less than 180 degrees. For example, a1 may be 90 degrees, and a2 may be 150 degrees.

For example, when being in a folded form, the electronic device may be shown in FIG. 3(d). Specifically, when the electronic device is in a folded form, an included angle between the first display area 301 and the second display area 302 is a third included angle β. As shown in FIG. 4, 0≤β≤a1, where a1 is greater than or equal to 0 degrees and less than or equal to 90 degrees. For example, a1 may be 0 degrees or 5 degrees. It should be noted that a specific value range in this application is merely an example rather than a limitation.

Figure 5A:
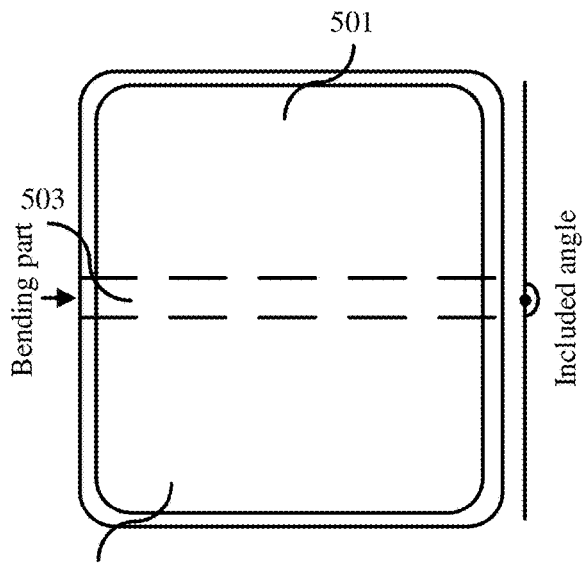
FIG. 5(a) to FIG. 5(d) are a schematic diagram of a physical form of an up-down foldable electronic device according to an embodiment of this application.
Figure 5B:
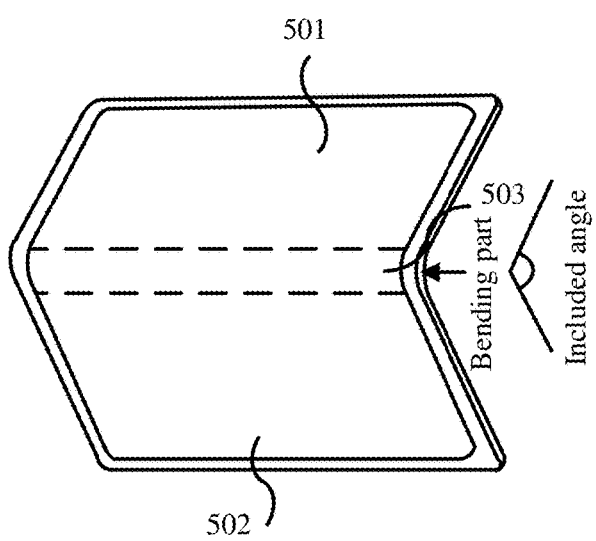
Figure 5C:
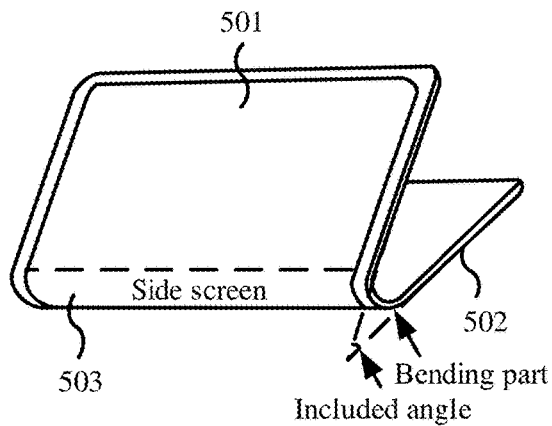
Figure 5D:
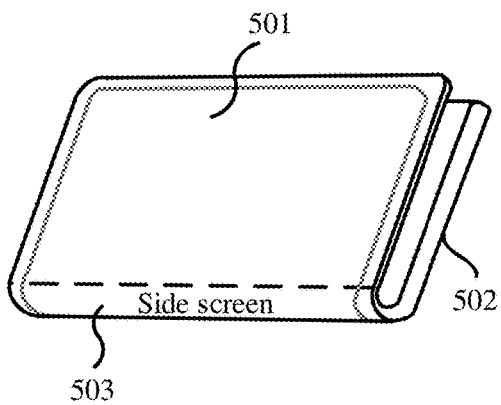

In the foregoing embodiment, the electronic device is folded left and right. In some other embodiments, the electronic device may alternatively be folded up and down. For example, in FIG. 3(a), a bending part may alternatively be horizontally disposed in FIG. 3(a), so that the electronic device can be folded up and down. For example, as shown in FIG. 5(a), a foldable screen of an electronic device may include a first display area 501, a second display area 502, and a third display area 503. The third display area 503 may be a foldable area. When the third display area 503 is bent or deformed, an included angle between the first display area 501 and the second display area 502 changes. Therefore, the up-down foldable electronic device may also include three physical forms, for example, a folded form, a semi-folded form, and an unfolded form. The folded form may be a form shown in FIG. 5(d), the semi-folded form may be a form shown in FIG. 5(c), and the unfolded form may be a form shown in FIG. 5(a) or FIG. 5(b).

In some embodiments, the electronic device may be folded left and right or folded up and down. Alternatively, the electronic device may be folded both up and down and folded left and right. The touch method provided in this application may be applied to an electronic device folded along various directions. The following embodiments are described by using an up-down foldable electronic device, for example, the electronic device shown in FIG. 5(a) to FIG. 5(d), as art example, specifically, by using an example in which the first display area 501 is used as a primary screen, and the second display area 502 is used as a secondary screen on the foldable electronic device shown in FIG. 5(a) to FIG. 5(d).

In embodiments of this application, when an electronic device configured with a foldable screen is in a folded form, a side screen may be used as a touch operation area of a user, that is, the user may perform a touch operation on the side screen, to control the electronic device. In a possible scenario, when determining that the user holds the electronic device, the electronic device may determine one or more touch areas on the side screen that contact a finger of the user, and then map touch functions and/or icons of one or more controls to the one or more touch areas on the side screen.

Figures 6A, 6B:
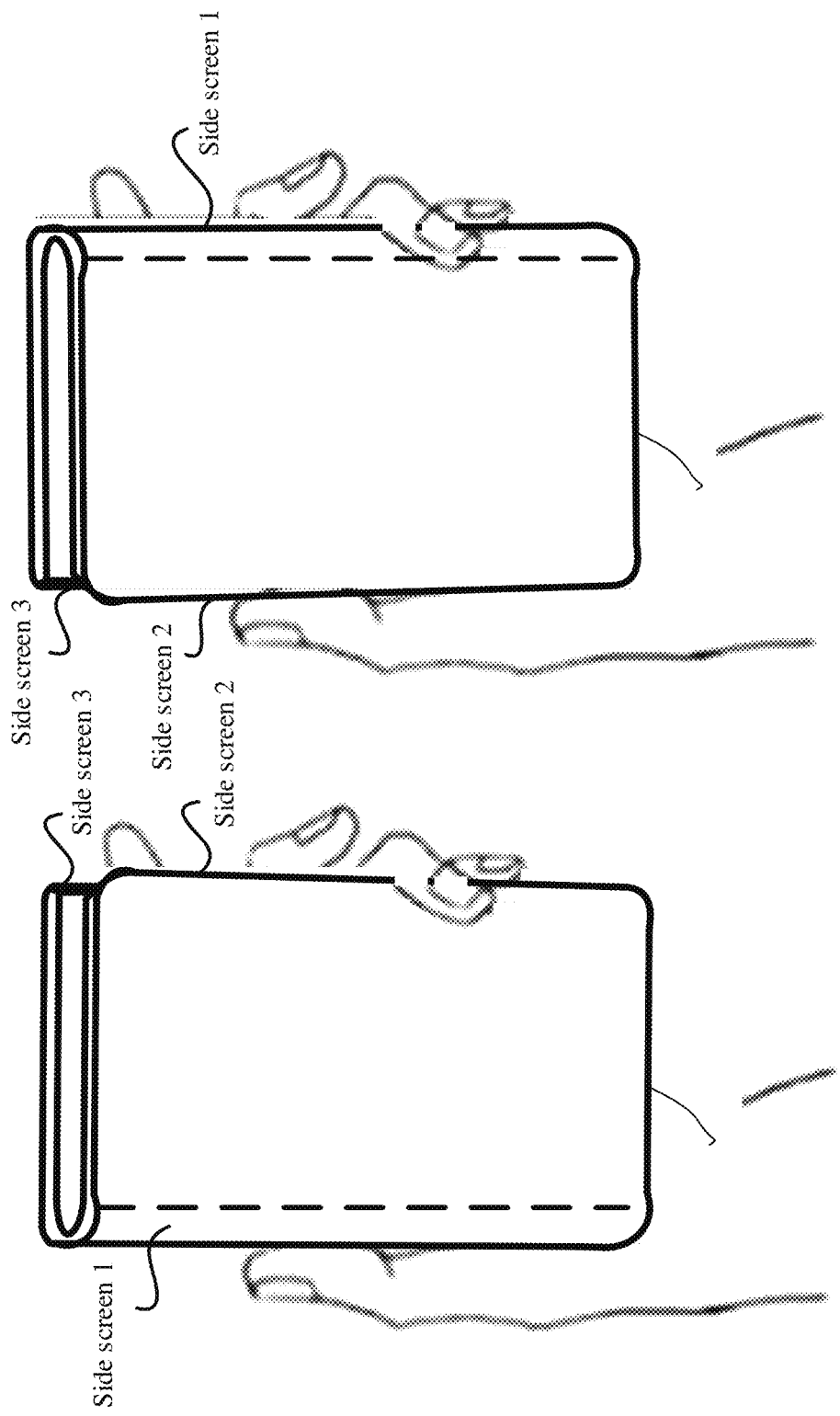
FIG. 6(a) and FIG. 6(b) are a schematic diagram of a holding state of a foldable electronic device according to an embodiment of this application.

In some embodiments, there may be a plurality of holding states of an up-down foldable electronic device, for example, two holding states in FIG. 6(a) and FIG. 6(b). The holding state shown in FIG. 6(a) is used as an example. A side screen 1 formed by a curved part of a display contacts a thumb of the user, and a touch area between the thumb of the user and the side screen 1 may be detected on the side screen 1. In some embodiments, a touchscreen is also disposed on a frame of the electronic device, as shown in FIG. 6(a). In this way, a touch area may be detected on the side screen 1, and touch areas between a finger of the user and a side screen 2 and a side screen 3 may also be detected on the side screen 2 and the side screen 3 on the frame of the electronic device. The holding state shown in FIG. 6(b) is used as an example. A side screen 1 formed by a curved part of a display contacts an index finger, a middle finger, and the like of the user, and touch areas between the index finger, the middle finger, and the like of the user and the side screen 1 may be detected on the side screen 1. In some embodiments, a touchscreen may also be disposed on a frame of the electronic device, as shown in FIG. 6(b). A touch area between a finger of the user and a side screen 2/side screen 3 may also be detected on the side screen 2/side screen 3. The following embodiments are described by using the holding state shown in FIG. 6(a) an example.

For example, as shown in FIG. 7(b), when the electronic device is in a folded state, a touch area 1 between the user and a side screen 1 may be detected on the side screen 1, and a touch area 2, a touch area 3, and a touch area 4 may be detected on a side screen 2. FIG. 7(a) is a schematic diagram of the side screen 1. The touch area 1 is detected on the side screen 1. FIG. 7(c) is a schematic diagram of the side screen 2. The touch area 2 to the touch area 4 may be detected on the side screen 2. The electronic device may map touch functions/icons of one or more controls to one or more of the touch area 1 to the touch area 4.

In a possible case, the electronic device may map only the touch functions of the one or more controls to the one or more of the touch area 1 to the touch area 4, that is, the touch area may not display the icons of the controls. For example, FIG. 7(*a*) to FIG. 7(*c*) are used as an example. A touch function of a control 1 is mapped to the area 1. When detecting a touch operation in the area 1, the electronic device maps the touch operation to an operation on the control 1. In some embodiments, when the touch function of the control 1 is mapped to the area 1, the area 1 may be lit up, and an area on the side screen 1 other than the area 1 may not be lit up, or the electronic device may display the area 1 in specific color information, to facilitate differentiation by the user.

In another possible case, the electronic device may map the icons of the one or more controls to the one or more of the touch area 1 to the touch area 4, that is, the touch area may display the icons of the controls. For example, FIG. 7(*a*) to FIG. 7(*c*) are used as an example. An icon of a control 1 is mapped to the area 1, that is, the area 1 displays the icon of the control 1, to help the user distinguish between different controls on the side screen. When detecting a trigger operation on an icon in the area 1, the electronic device may respond to the operation.

Several examples are listed in the following embodiments.

EXAMPLE 1

As shown in FIG. 7(*a*) to FIG. 7(*c*), the electronic device may map a brightness adjustment function of the display to a specific area in the area 1 to the area 4, and may further map a volume adjustment function to a specific area in the area 1 to the area 4. For example, the volume adjustment function may be mapped to the area 1, and the brightness adjustment function may be mapped to the area 2. When detecting a touch operation (for example, a slide operation) performed by the user in the area 1, the electronic device may implement volume adjustment. For example, when detecting a down-slide operation performed by the user in the area 1, the electronic device may decrease volume, or when detecting an up-slide operation performed by the user in the area 1, the electronic device may increase the volume. When detecting a touch operation (for example, a slide operation) performed by the user in the area 2, the electronic device may implement corresponding display brightness adjustment. For example, when detecting an up-slide operation performed by the user in the area 2, the electronic device may also increase display brightness, or when detecting a down-slide operation performed by the user in the area 2, the electronic device may decrease the display brightness.

EXAMPLE 2

When the electronic device is in a folded form, the primary screen displays a first interface of a first application, and the side screen and the secondary screen are off. The electronic device may map touch functions/icons of one or more controls in the first interface on the primary screen to a specific area in the area 1 to the area 4. It should be noted that a control in the first interface that is mapped by the electronic device to the side screen may be specified by the user, or may be set by a system of the electronic device. This is not limited in embodiments of this application. In addition, a control in the first interface on the primary screen that is mapped by the electronic device to the side screen may alternatively be specified by the user, or may be set by default.

As shown in FIG. 8(*a*), the electronic device is in a folded form, and a primary screen displays a lock screen interface. The lock screen interface includes one or more controls of a music player, for example, a control 801 for a previous song, a control 802 for a next song, and a pause control 803. The user holds the electronic device. After detecting the area 1 to the area 4, the electronic device may map touch functions of one or more controls in the lock screen interface to one or more of the area 1 to the area 4. For example, the electronic device maps a touch function of the control 801 for a previous song to the area 1, maps a touch function of the 802 for a next song to the area 2, and maps a touch function of the pause control 803 to the area 4. In some embodiments, the electronic device may light up the area 1, the area 2, and the area 4, or display different color information in the area 1, the area 2, and the area 4, or move an icon of the control 801 for a previous song, an icon of the control 802 for a next song, and an icon of the pause control 803 to corresponding areas, as shown in FIG. 8(*b*).

For example, after mapping an icon of a control on the primary screen to a touch area between the side screen and the user, the electronic device may not display the icon of the control on the primary screen, and/or disable a touch function of the control on the primary screen.

EXAMPLE 3

As shown in FIG. 9(*a*), the electronic device is in a folded form, a primary screen displays a WeChat interface, and the WeChat interface is a chat interface 905 with a contact Amy. The chat interface 905 includes a plurality of controls, for example, an emoticon control 901 and a voice control 902. The user holds the electronic device. After detecting a touch area between the user and a side screen, the electronic device may map the controls in the chat interface to the touch area on the side screen. For example, as shown in FIG. 9(*b*), the electronic device maps the emoticon control 901 to an area 2, and maps the voice control 902 to an area 1. When the electronic device detects an operation on the emoticon control 901 in the area 2, the chat interface 905 on the primary screen displays various emoticons, as shown in FIG. 9(*c*). In this way, when holding the electronic device, the user can implement touch on different controls on the primary screen without substantially adjusting a hand holding state.

The foregoing are several examples in which the electronic device maps the one or more controls in the first interface on the primary screen to the touch area between the user and the side screen in the process in which the user holds the electronic device, mainly including WeChat and a music player. Actually, when displaying an interface of another application (for example, iQIYI or Gallery), the electronic device may map touch functions of one or more controls in the interface of the another application to the touch area between the user and the side screen. Examples are not listed one by one in this application.

In some embodiments, in a process in which the user holds the electronic device, a touch area between a finger of the user and a side screen may change. FIG. 9(*b*) is used as an example. In the process in which the user holds the electronic device, a location of the area 1 may change. In this case, the electronic device may map the voice control 902 to a changed location of the area 1. In other words, the electronic device may move an icon of a control with the touch area between the user and the side screen, to facilitate user operations.

In some embodiments, the electronic device may enable or disable a side-screen mapping function. For example, the electronic device may provide, by using Settings, an activation control used to enable or disable the side-screen mapping function. When the activation control is activated, the electronic device enables the side-screen mapping function, or when the activation control is deactivated, the electronic device disables the side-screen mapping function. In some other embodiments, when the electronic device detects that the electronic device is currently in a folded form and the user currently holds the electronic device, the electronic device may enable the side-screen mapping function. In still some other embodiments, when the electronic device detects that the electronic device is currently in a folded form, the primary screen displays the first interface, and the user currently holds the electronic device, the electronic device may enable the side-screen mapping function. In some other embodiments, when the electronic device detects that the electronic device is currently in a folded form, the primary screen displays the first interface, and the user currently holds the electronic device and holding state duration exceeds a preset duration, the electronic device enables the side-screen mapping function. The electronic device may determine, by collecting a user fingerprint, that the user holds the electronic device. For example, the electronic device determines that the electronic device is currently in a folded form, and when detecting that the side screen includes one or more fingerprints and the secondary screen includes a palmprint, the electronic device may determine that the user holds the electronic device.

In embodiments of this application, after enabling the side-screen mapping function, the electronic device may learn of a touch area between the user and the side screen when the user holds the electronic device. In a relatively simple implementation, when detecting that the user holds the electronic device, the electronic device determines a touch area between a finger of the user and the side screen, and then maps icons/touch functions of one or more controls to the touch area. When the touch area between the finger of the user and the side screen changes in the process in which the user holds the electronic device, the electronic device may map the icons/touch functions of the one or more controls to a new touch area.

In another possible implementation, when the user holds the electronic device, the touch area between the finger of the user and the side screen may dynamically change. Therefore, the electronic device may learn, in a machine learning manner, the touch area between the user and the side screen when the user holds the electronic device. The machine learning manner may be a binary neural network learning manner or another neural network learning manner. This is not limited in embodiments of this application. It should be understood that a training set needs to be used in the machine learning manner, and the training set may be used to determine the touch area between the user and the side screen. The electronic device may collect a training set. An example of collecting a training set is provided below.

Figure 10B:
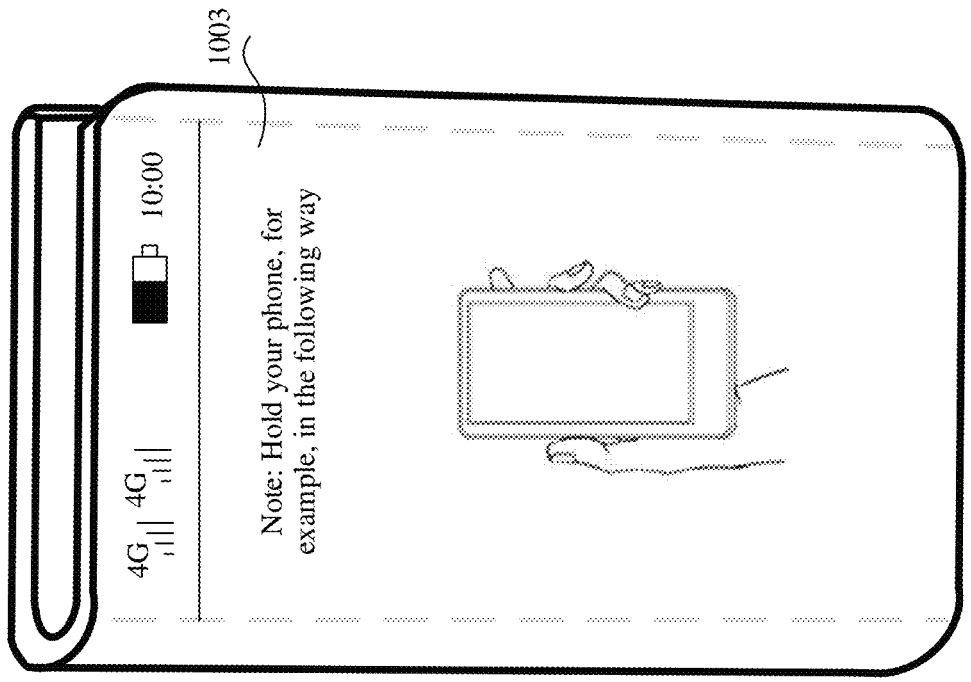
Figure 10A:
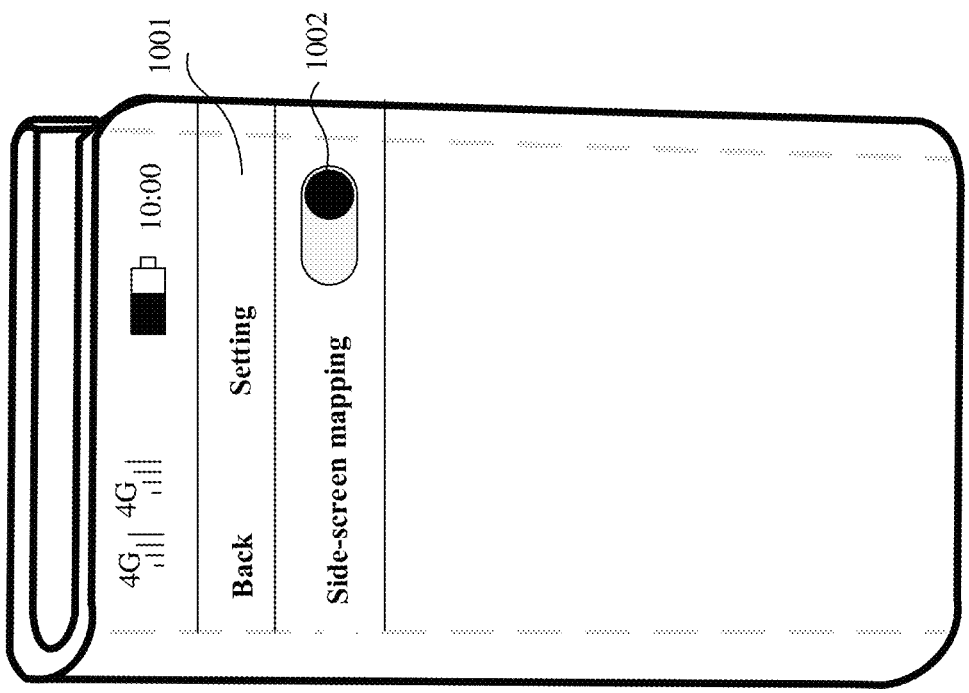

For example, as shown in FIG. 10(a), the electronic device displays an interface 1001 of Settings. The interface 1001 includes an option for setting side-screen mapping and an activation control 1002. When detecting that the activation control 1002 is activated, the electronic device displays an interface 1003 shown in FIG. 10(b). The interface 1003 displays prompt information. The prompt information is used to prompt the user to hold the electronic device, for example, in a manner shown in FIG. 10(b). After determining that the user has held the electronic device, the electronic device may output prompt information. As shown in FIG. 10(c), the prompt information is used to prompt the user to tap twice (or five times, 10 times, or the like) by using a thumb. In this way, the electronic device may collect at least two tap operations on a side screen 1, and further determine location coordinates of at least two touch areas. The location coordinates of the two touch areas may constitute a training set. In some examples, still as shown in FIG. 10(c), when detecting a trigger operation "Ignore the finger", the electronic device does not record an area 1 in which the thumb touches the side screen 1 in FIG. 10(c), and enters a setting interface corresponding to a next finger, for example, an interface shown in FIG. 10(d). FIG. 10(c) is still used as an example. When detecting a trigger operation "Reset", the electronic device may re-prompt the user to tap twice by using the thumb. When detecting a trigger operation "Complete the setting", the electronic device enters the setting interface corresponding to the next finger, for example, the interface shown in FIG. 10(d).

Figure 10D:
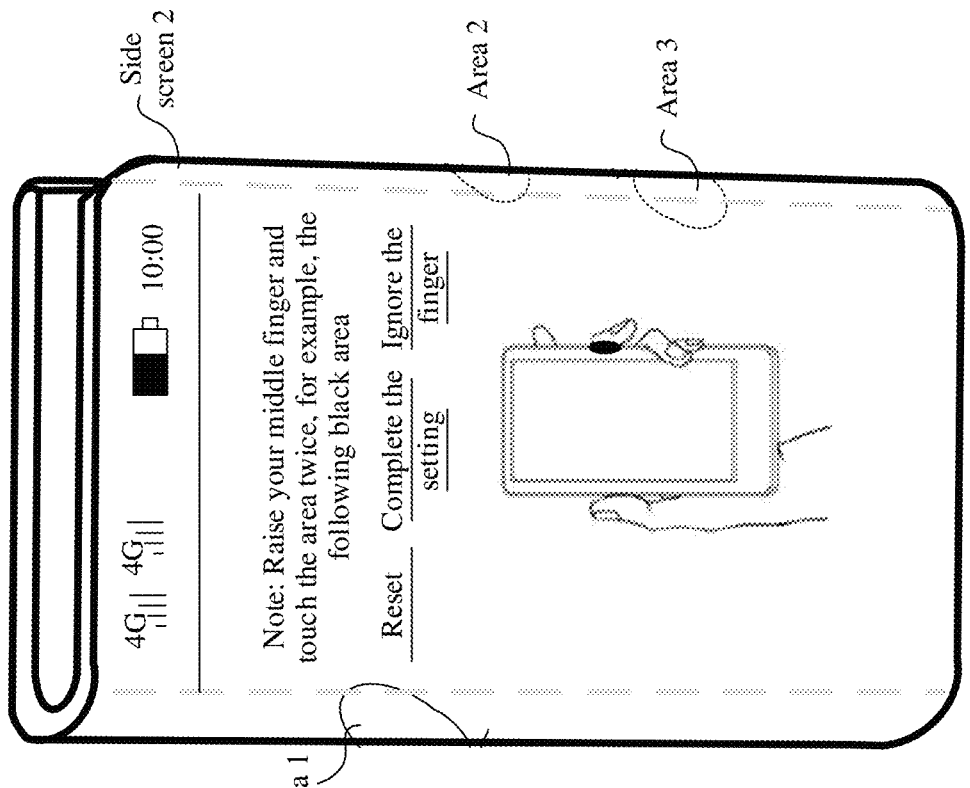
Figure 10C:
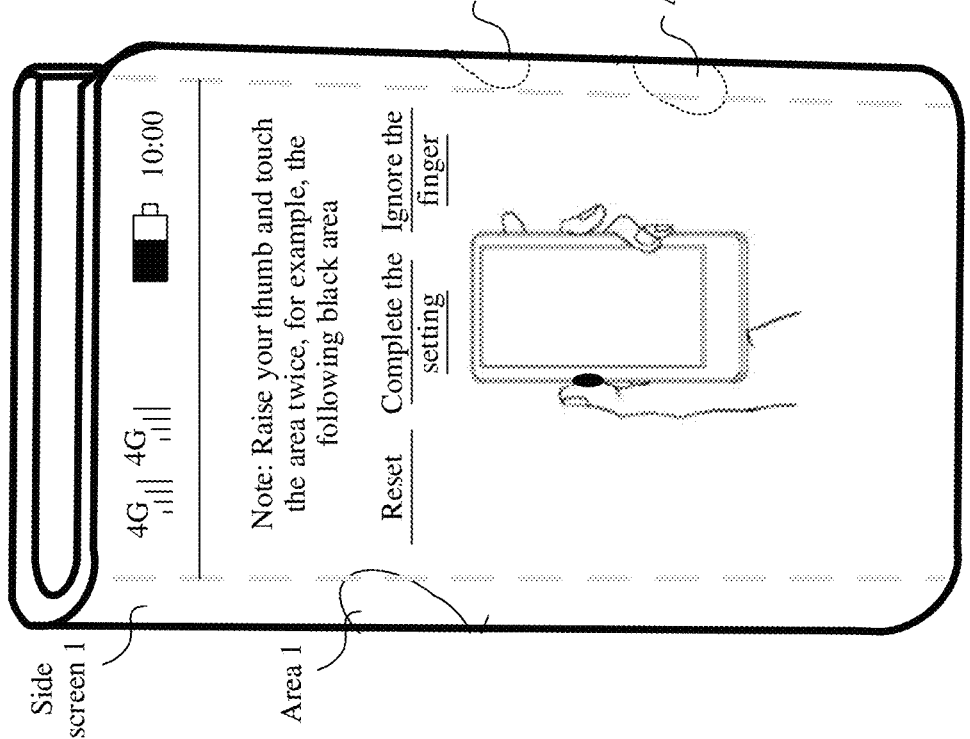

As shown in FIG. 10(d), the electronic device outputs prompt information, and the prompt information is used to prompt the user to raise a middle finger and tap twice. The electronic device may collect two tap operations on a side screen 2, and further determine location coordinates of two touch areas 2 corresponding to the two tap operations. The location coordinates of the two touch areas 2 may constitute a training set. Similarly, still as shown in FIG. 10(d), when detecting a trigger operation "Ignore the finger", the electronic device does not record an area 2 in which the middle finger touches the side screen 2, and enters a setting interface corresponding to a next finger, for example, an interface shown in FIG. 10(e). FIG. 10(d) is still used as an example. When detecting a trigger operation "Reset", the electronic device may re-prompt the user to tap twice by using the middle finger. When detecting a trigger operation "Complete the setting", the electronic device enters the setting interface corresponding to the next finger, for example, the interface shown in FIG. 10(e).

As shown in FIG. 10(e), the electronic device outputs prompt information, and the prompt information is used to prompt the user to raise a ring finger and tap twice. The electronic device may collect two tap operations on the side screen 2, and further determine location coordinates of two touch areas 3 corresponding to the two tap operations. The location coordinates of the two touch areas 3 may constitute a training set. Similarly, as shown in FIG. 10(e), when detecting a trigger operation "Ignore the finger", the electronic device may display an interface shown in FIG. 10(f), that is, the electronic device does not record the areas 3 of the ring finger on the side screen 2. When detecting a trigger operation "Reset", the electronic device may re-prompt the user to tap twice by using the ring finger. When detecting a trigger operation "Complete the setting", the electronic device displays the interface shown in FIG. 10(f). As shown in FIG. 10(f), the electronic device displays two controls: "Reset" and "Complete the setting". If the electronic device detects "Complete the setting", the electronic device stores a recorded touch area corresponding to each finger. If the electronic device detects "Reset", the electronic device displays the interface shown in FIG. 10(b).

In some embodiments, as shown in FIG. 10(a) to FIG. 10(f), each finger taps twice or more. Therefore, in each touch area, the electronic device collects at least two location coordinates as a training set. The training set may be used to train a machine learning model. For example, the machine learning model may be a relationship between an input parameter, a model parameter, and an output parameter, it is assumed that five fingers of the user separately touch the side screen, and touch areas are an area 1 to an area 5, that is, the training set includes location coordinates of the area 1 to the area 5. A process in which the electronic device trains the model by using the training set may be as follows: The electronic device may use the location coordinates of the area 1 to the area 4 as the input parameter of the machine learning model, to obtain an output result. The output result is the location coordinates of the area 5. If a difference between the output result and the recorded location coordinates of the area 5 is relatively large, the model parameter is adjusted until the difference between the output result and the recorded location coordinates of the area 5 is not large. This process is a model training process. After model training is performed, the model may be used, that is, when the user holds the electronic device, the electronic device may use coordinates of touch points of some fingers to determine coordinates of touch points of other fingers.

Figure 11:
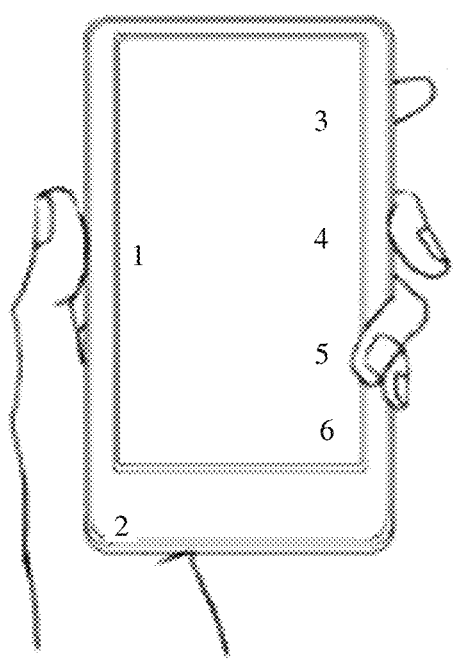
FIG. 11 is a schematic diagram of a graphical user interface of a foldable electronic device according to an embodiment of this application.

For example, in a process in which the user holds the electronic device, there is a relatively high possibility that a location of the thumb changes, that is, there is a relatively high possibility/frequency that a touch area between the thumb and the side screen changes. When detecting that the user holds the electronic device, the electronic device may calculate location coordinates of the touch area between the thumb and the side screen by using another touch area. For example, as shown in FIG. 11, the electronic device may calculate, by using a machine learning model, location coordinates of a point 1 based on location coordinates of a touch area 2/3/4/5/6, to obtain the touch area between the thumb and the side screen. After the location of the point 1 is calculated, if a thumb tap event of the user is identified but is not within the calculated location of the point 1, it indicates that the location of the point 1 that is calculated by using the machine learning model is inaccurate, and the electronic device may add coordinates corresponding to the tap event to the training set, to improve training accuracy.

In some other embodiments, the electronic device may collect location coordinates of more touch points. For example, the electronic device may prompt the user to use the thumb to tap the side screen 10 times, so that the electronic device obtains coordinates of 10 touch points of the thumb, The electronic device may further prompt the user to use each of other fingers to tap the side screen 10 times, so that the electronic device obtains coordinates of 10 touch points of each finger. Coordinates of five touch points of each finger may be used as a training set, and coordinates of the remaining contact points may be used as a verification set. The verification set may be used to verify whether the trained model is accurate. A manner in which the verification set verifies the trained model is similar to the model training process, and details are not described herein again.

Implementations of this application may be combined randomly to implement different technical effects.

Figure 12:
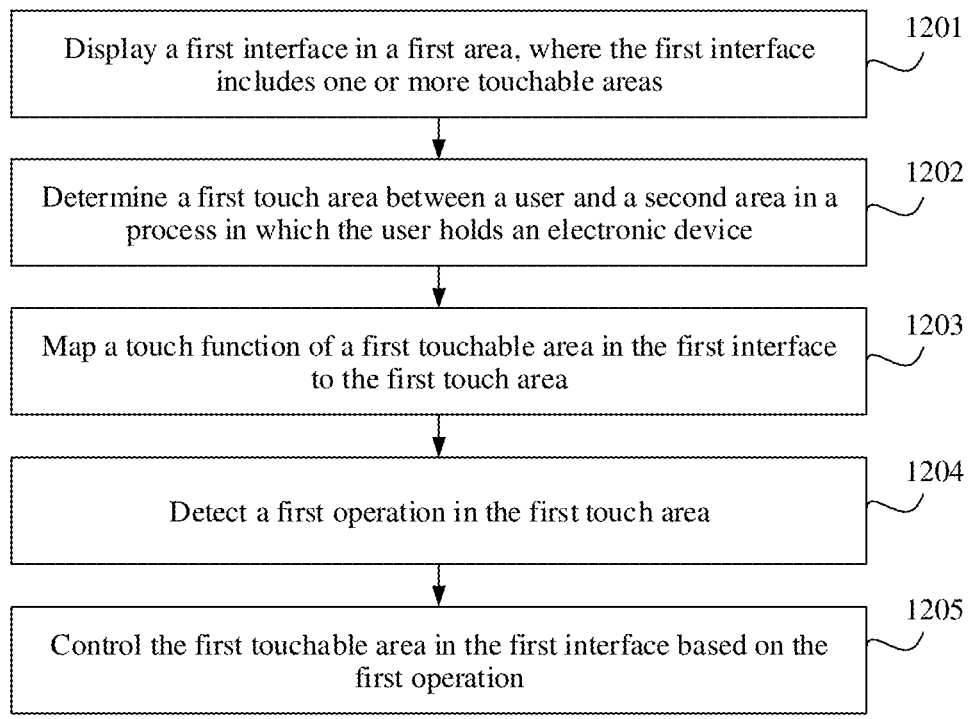
FIG. 12 is a schematic flowchart of a touch method according to an embodiment of this application.

With reference to the foregoing embodiments and related accompanying drawings, embodiments of this application provide a touch method. The method may be implemented by an electronic device (for example, a mobile phone or a tablet computer) with a foldable display. The display includes a first area, a second area, and a third area. When the electronic device is in a folded form, an included angle between the first area and the second area is less than a first preset angle, and two sides of the third area are the first area and the second area. For example, a structure of the electronic device may be as shown in FIG. 1. As shown in FIG. 12, a procedure of the method may include the following steps.

1201: Display a first interface in the first area, where the first interface includes one or more touchable areas.

For example, in FIG. 8(*a*) and FIG. 8(*b*), the first area displays the first interface, that is, a lock screen interface. The lock screen interface may include one or more touchable areas.

1202: Determine a first touch area between a user and the second area in a process in which the user holds the electronic device.

For example, in FIG. 8(*a*) and FIG. 8(*b*), in the process in which the user holds the electronic device, a touch area between the user and the side screens of the electronic device may include an area 1, an area 2, an area 3, and an area 4.

1203: Map a touch function of a first touchable area in the first interface to the first touch area.

For example, in FIG. 8(*a*), the first area of the electronic device displays the lock screen interface. The electronic device may map one or more buttons on the lock screen interface to one or more of the area 1 to the area 4 on the side screen. For example, as shown in FIG. 9(*b*), the electronic device maps the button 801 on the lock screen interface to the area 1 on the side screen, and maps the button 802 to the area 2 on the side screen.

1204: Detect a first operation in the first touch area.

For example, in FIG. 8(*b*), if the electronic device detects the first operation performed by the user in the area 1 on the side screen, the first operation may be tap, for example, tap, double tap, or touch and hold.

1205: Control the first touchable area in the first interface based on the first operation.

For example, in FIG. 8(*b*), if the electronic device detects the first operation performed by the user in the area 1 on the side screen, the electronic device may control the "previous song" button on the lock screen interface based on the first operation.

In embodiments provided in this application, the method provided in embodiments of this application is described from a perspective of the electronic device (the mobile phone 100) as an execution body. To implement functions in the method provided in embodiments of this application, a terminal device may include a hardware structure and/or a software module, to implement the functions in a form of a hardware structure, a software module, or a combination of a hardware structure and a software module. Whether a specific function in the foregoing functions is performed by using the hardware structure, the software module, or the combination of the hardware structure and the software module depends on particular application and design constrain conditions of the technical solutions.

Figure 13:
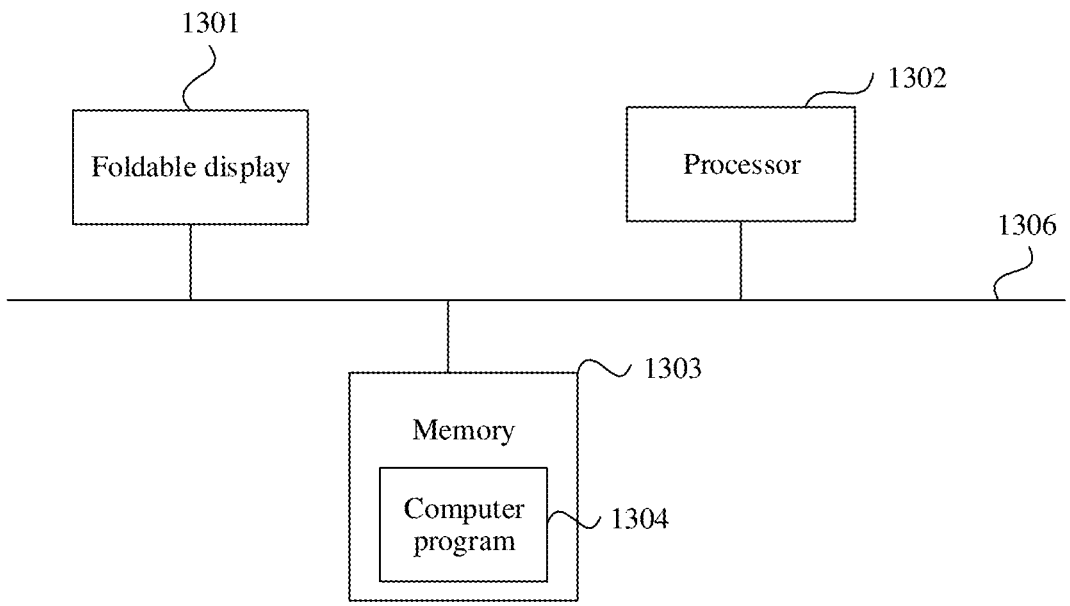
FIG. 13 is a schematic diagram of a structure of a foldable electronic device according to an embodiment of this application.

As shown in FIG. 13, some other embodiments of this application disclose an electronic device. The electronic device may be an electronic device with a foldable display, for example, a foldable mobile phone or a foldable tablet computer. The electronic device may include: a foldable display 1301, one or more processors 1302, one or more memories 1303, and one or more computer programs 1304. The components may be connected by using one or more communications buses 1306.

The foldable display 1301 may be configured to display a home screen or a display interface of an application in the electronic device.

The one or more computer programs 1304 are stored in the one or more memories 1303 and are executed by the one or more processors 1302. The one or more computer programs 1304 include instructions. The instructions may be used to perform the steps in the corresponding embodiments in FIG. 3 to FIG. 12.

For example, the electronic device shown in FIG. 13 may be the mobile phone 100 shown in FIG. 1. In this case, the one or more processors 1302 may be the processor 110, and the foldable display 1301 may be the display 194. The one or more memories 1303 may be the internal memory 121.

According to context, the term "when . . . " or "after . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ,", "in response to determining . . . ,", "when (a stated condition or event) is detected", or "in response to detecting (a stated condition or event)". In addition, in the foregoing embodiments, relationship terms such as "first" and "second" are used to distinguish one entity from another entity, but do not limit any actual relationship and sequence between these entities.

Some or all of the foregoing embodiments may be implemented by using software, hardware, firmware, or any combination thereof. When the software is used for implementation, all or some of embodiments may be implemented in a form of a computer program product. The computer program product includes one or more computer instructions. When the computer program instructions are loaded and executed on a computer, some or all of the procedures or the functions in embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium that can be accessed by a computer, or a data storage device, such as a server or a data center, integrating one or more available media. The available medium may be a magnetic medium (for example, a floppy disk, a hard disk, or a magnetic tape), an optical medium (for example, a DVD), a semiconductor medium (for example, a solid-state drive (SSD)), or the like.

It should be noted that a part of this patent application document includes content protected by the copyright. The copyright owner reserves the copyright except copies are made for the patent documents or the recorded content of the patent documents in the Patent Office.

What is claimed is:

1. A method of processing a touching operation, applied to an electronic device including a foldable display, wherein the foldable display includes a first area, a second area, and a third area;

when the electronic device is in a folded form, an included angle between the first area and the second area is less than a first preset angle, the third area forms a side screen of the foldable display, and two sides of the side screen are the first area and the second area; and the method comprises, while the electronic device is in the folded form:

displaying a first interface in the first area, wherein the first interface comprises one or more touchable areas;

detecting at least two touch events of a user on the side screen when the electronic device is being held by the user;

determining at least two touch areas on the side screen each corresponding to one of the at least two touch events of the user on the side screen of the foldable display;

determining a first touch area on the side screen based on the determined at least two touch areas on the side screen corresponding to the at least two touch events of the user on the side screen of the foldable display;

mapping a touch function of a first touchable area in the first interface of the first area to the determined first touch area of the side screen;

detecting a first operation performed in the first touch area of the side screen; and controlling the first touchable area in the first interface of the first area based on the first operation performed in the first touch area of the side screen, wherein the determination of the first touch area on the side screen based on the determined at least two touch areas on the side screen comprises:

determining location coordinates of the at least two touch areas on the side screen corresponding to the at least two touch events of the user on the side screen; and obtaining location coordinates of the first touch area on the side screen using the location coordinates of the determined at least two touch areas on the side screen; and the method further comprises:

determining that a touch area on the side screen of the foldable display changes from the first touch area to a third touch area when the electronic device is being held by the user; and mapping the touch function of the first touchable area in the first area to the third touch area on the side screen.

2. The method according to claim 1, wherein the first touchable area comprises one or more buttons, and the method further comprises:

displaying icons of the one or more buttons in the first touch area on the side screen.

3. The method according to claim 2, further comprising:

disabling the touch function of the first touchable area in the first interface; and/or canceling displaying the icons of the one or more buttons in the first interface.

4. The method according to claim 1, further comprising:

mapping a volume adjustment function and/or a display brightness adjustment function of the electronic device to a second touch area on the side screen of the foldable display.

5. The method according to claim 1, wherein the first touchable area is specified by the user or is preset, or a touchable area with the most or least touches in the first interface is determined as the first touchable area.

6. The method according to claim 1, further comprising:

lighting up the first touch area, wherein an area on the side screen other than the first touch area is in a screen-off state; or displaying a first color in the first touch area, and displaying a second color in the area on the side screen other than the first touch area.

7. An electronic device, comprising:

a foldable display, wherein the foldable display comprises a first area, a second area, and a third area, and when the electronic device is in a folded form, an included angle between the first area and the second area is less than a first preset angle, the third area forms a side screen of the foldable display, and two sides of the side screen are the first area and the second area;

one or more processors; and one or more memories storing one or more computer programs including instructions that, when executed by the one or more processors, enable the electronic device to, while the electronic device is in the folded form:

display a first interface in the first area, wherein the first interface comprises one or more touchable areas;

detect at least two touch events of a user on the side screen when the electronic device is being held by the user;

determine at least two touch areas corresponding to the at least two touch events of the user on the side screen of the foldable display;

determine a first touch area on the side screen based on the determined at least two touch areas on the side screen corresponding to the at least two touch events of the user on the side screen of the foldable display;

map a touch function of a first touchable area in the first interface of the first area to the first touch area of the side screen;

detect a first operation performed in the first touch area of the side screen; and control the first touchable area in the first interface of the first area based on the first operation performed in the first touch area of the side screen, wherein the determination of the first touch area on the side screen based on the determined at least two touch areas on the side screen comprises:

determining location coordinates of the at least two touch areas on the side screen corresponding to the at least two touch events of the user on the side screen; and obtaining location coordinates of the first touch area on the side screen using the location coordinates of the determined at least two touch areas on the side screen; and wherein the instructions, when executed by the one or more processors, further enable the electronic device to:

determine that a touch area on the side screen of the foldable display changes from the first touch area to a third touch area when the electronic device is being held by the user; and map the touch function of the first touchable area in the first area to the third touch area on the side screen.

8. The electronic device according to claim 7, wherein the first touchable area comprises one or more buttons, and the instructions, when executed by the one or more processors, further enable the electronic device to:

display icons of the one or more buttons in the first touch area.

9. The electronic device according to claim 8, wherein the instructions, when executed by the one or more processors, further enable the electronic device to:

disable the touch function of the first touchable area in the first interface; and/or cancel displaying the icons of the one or more buttons in the first interface.

10. The electronic device according to claim 7, wherein the instructions, when executed by the one or more processors, further enable the electronic device to:

map a volume adjustment function and/or a display brightness adjustment function of the electronic device to a second touch area on the side screen of the foldable display.

11. The electronic device according to claim 7, wherein the first touchable area is specified by the user or is preset, or a touchable area with the most or least touches in the first interface is determined as the first touchable area.

12. The electronic device according to claim 7, wherein the instructions, when executed by the one or more processors, further enable the electronic device to:

light up the first touch area, wherein an area on the side screen other than the first touch area is in a screen-off state; or display a first color in the first touch area, and display a second color in the area on the side screen other than the first touch area.

13. A non-transitory computer-readable storage medium, storing a computer program, wherein the computer program comprises program instructions that, when executed by an electronic device, enable the electronic device to perform operations comprising, while the electronic device is in a folded form:

displaying a first interface in a first area of a foldable display of the electronic device, wherein the first interface comprises one or more touchable areas, the foldable display includes the first area, a second area and a third area, and when the electronic device is in the folded form, an included angle between the first area and the second area is less than a first preset angle, the third area forms a side screen of the foldable display, and two sides of the side screen are the first area and the second area;

detecting at least two touch events of a user on the side screen when the electronic device is being held by the user;

determining at least two touch areas on the side screen each corresponding to one of the at least two touch events of the user on the side screen of the foldable display; determining a first touch area on the side screen based on the determined at least two touch areas on the side screen corresponding to the at least two touch events of the user on the side screen of the foldable display;

mapping a touch function of a first touchable area in the first interface of the first area to the first touch area of the side screen;

detecting a first operation performed in the first touch area of the side screen; and controlling the first touchable area in the first interface of the first area based on the first operation performed in the first touch area of the side screen, wherein the determination of the first touch area on the side screen based on the determined at least two touch areas on the side screen comprises:

determining location coordinates of the at least two touch areas on the side screen corresponding to the at least two touch events of the user on the side screen; and obtaining location coordinates of the first touch area on the side screen using the location coordinates of the determined at least two touch areas on the side screen; and the operations further comprise:

determining that a touch area on the side screen of the foldable display changes from the first touch area to a third touch area when the electronic device is being held by the user; and mapping the touch function of the first touchable area in the first area to the third touch area on the side screen.

14. The non-transitory computer-readable storage medium according to claim 13, wherein the detected at least two touch events correspond to at least two tap operations performed by the user on the side screen.

15. The non-transitory computer-readable storage medium according to claim 13, wherein the operations further comprise, before the detection of the at least two touch events of the user on the third area, displaying, on the first area, prompt information prompting the user to perform one or more operations corresponding to the at least two touch events.

16. The non-transitory computer-readable storage medium according to claim 13, wherein the operations further comprise:
   collecting location coordinates of the determined at least two touch areas corresponding to the at least two touch events as a training set; and
   training a machine learning model using the training set as an input parameter to obtain location coordinates of the first touch area on the side screen.

* * * * *

UNITED STATES PATENT AND TRADEMARK OFFICE
CERTIFICATE OF CORRECTION

PATENT NO. : 12,210,741 B2
APPLICATION NO. : 17/638325
DATED : January 28, 2025
INVENTOR(S) : Songping Yao et al.

Page 1 of 1

It is certified that error appears in the above-identified patent and that said Letters Patent is hereby corrected as shown below:

In the Specification

Column 14, Line 14, change "as art example" to -- as an example --.

Signed and Sealed this
Twenty-fifth Day of February, 2025

Coke Morgan Stewart
*Acting Director of the United States Patent and Trademark Office*